(12) United States Patent
Burch et al.

(10) Patent No.: US 8,079,069 B2
(45) Date of Patent: Dec. 13, 2011

(54) CARDSPACE HISTORY VALIDATOR

(75) Inventors: Lloyd Leon Burch, Payson, UT (US); Srinivas Vedula, Orem, UT (US)

(73) Assignee: Oracle International Corporation, Redwood City, CA (US)

( * ) Notice: Subject to any disclaimer, the term of this patent is extended or adjusted under 35 U.S.C. 154(b) by 725 days.

(21) Appl. No.: 12/054,137

(22) Filed: Mar. 24, 2008

(65) Prior Publication Data
US 2009/0241178 A1 Sep. 24, 2009

(51) Int. Cl.
*G06F 7/04* (2006.01)

(52) U.S. Cl. ............................................ 726/9; 713/173

(58) Field of Classification Search .................... 713/173
See application file for complete search history.

(56) References Cited

U.S. PATENT DOCUMENTS

| | | | |
|---|---|---|---|
| 3,614,839 | A | 10/1971 | Thomas |
| 3,949,501 | A | 4/1976 | Andrews et al. |
| 4,153,931 | A | 5/1979 | Green et al. |
| 4,568,403 | A | 2/1986 | Egan |
| 4,730,848 | A | 3/1988 | McCormick |
| 5,073,950 | A | 12/1991 | Colbert et al. |
| 5,485,510 | A | 1/1996 | Colbert |
| 5,546,471 | A | 8/1996 | Merjanian |
| 5,546,523 | A | 8/1996 | Gatto |
| 5,594,806 | A | 1/1997 | Colbert |
| 5,613,012 | A | 3/1997 | Hoffman et al. |
| 5,848,412 | A | 12/1998 | Rowland et al. |
| 6,028,950 | A | 2/2000 | Merjanian |
| 6,055,595 | A | 4/2000 | Tachibana et al. |
| 6,327,578 | B1 | 12/2001 | Linehan |
| 6,363,488 | B1 | 3/2002 | Ginter et al. |
| 6,481,621 | B1 | 11/2002 | Herrendoerfer et al. |
| 6,513,721 | B1 | 2/2003 | Salmre et al. |
| 6,612,488 | B2 | 9/2003 | Suzuki |
| 6,721,713 | B1 | 4/2004 | Guheen et al. |
| 6,880,155 | B2 | 4/2005 | Schwabe et al. |
| 6,913,194 | B2 | 7/2005 | Suzuki |
| 6,970,836 | B1 | 11/2005 | Paltenghe et al. |
| 7,003,501 | B2 | 2/2006 | Ostroff |
| 7,103,575 | B1 | 9/2006 | Linehan |
| 7,104,444 | B2 | 9/2006 | Suzuki |
| 7,210,620 | B2 | 5/2007 | Jones |

(Continued)

FOREIGN PATENT DOCUMENTS
EP 0917120 5/1999
(Continued)

OTHER PUBLICATIONS

Waleed et al., "Addressing privacy issues in CardSpace", 2007, IEEE, pp. 285-291.*

(Continued)

*Primary Examiner* — Matthew Smithers
(74) *Attorney, Agent, or Firm* — Marger Johnson & McCollom PC

(57) ABSTRACT

Before a relying party grants a client access to a resource, the last use of the security token by the client to access the resource of the relying party can be verified. Verification can be accomplished by comparing the last time the client sent the security token to the relying party with the last time the relying party received the security token from the client. If the last use of the security token is not verified, the possibility exists that the security token has been fraudulently used by a third party.

27 Claims, 18 Drawing Sheets

U.S. PATENT DOCUMENTS

| | | | | |
|---|---|---|---|---|
| 7,225,156 | B2 | 5/2007 | Fisher et al. | |
| 7,231,369 | B2 | 6/2007 | Hirabayashi | |
| 7,343,351 | B1 | 3/2008 | Bishop et al. | |
| 7,353,532 | B2 | 4/2008 | Duri et al. | |
| 7,360,237 | B2 | 4/2008 | Engle et al. | |
| 7,416,486 | B2 | 8/2008 | Walker et al. | |
| 7,444,519 | B2* | 10/2008 | Laferriere et al. | 713/185 |
| 7,487,920 | B2 | 2/2009 | Sato et al. | |
| 7,494,416 | B2 | 2/2009 | Walker et al. | |
| 7,500,607 | B2 | 3/2009 | Williams | |
| 7,529,698 | B2 | 5/2009 | Joao | |
| 7,537,152 | B2 | 5/2009 | Chakiris et al. | |
| RE40,753 | E | 6/2009 | Wang et al. | |
| 7,555,460 | B1 | 6/2009 | Barkan | |
| 7,565,329 | B2 | 7/2009 | Lapsley et al. | |
| 7,591,424 | B2 | 9/2009 | Wang et al. | |
| 7,594,258 | B2 | 9/2009 | Mao et al. | |
| 7,610,040 | B2 | 10/2009 | Cantini et al. | |
| 7,613,659 | B1 | 11/2009 | Hoffman et al. | |
| 7,620,177 | B2 | 11/2009 | Ibrahim et al. | |
| 7,636,941 | B2 | 12/2009 | Blinn et al. | |
| 7,661,585 | B2 | 2/2010 | Joao | |
| 7,664,022 | B2 | 2/2010 | Hu | |
| 7,747,540 | B2 | 6/2010 | Cameron et al. | |
| 7,771,273 | B2 | 8/2010 | Walker et al. | |
| 7,788,499 | B2 | 8/2010 | Cameron et al. | |
| 7,797,413 | B2 | 9/2010 | Adelman et al. | |
| 7,797,434 | B2 | 9/2010 | Blakley et al. | |
| 7,831,522 | B1 | 11/2010 | Satish et al. | |
| 7,860,883 | B2 | 12/2010 | Hinton et al. | |
| 2001/0007983 | A1 | 7/2001 | Lee | |
| 2002/0026397 | A1 | 2/2002 | Ieta et al. | |
| 2002/0029337 | A1 | 3/2002 | Sudia et al. | |
| 2002/0029342 | A1 | 3/2002 | Keech | |
| 2002/0046041 | A1 | 4/2002 | Lang | |
| 2002/0083014 | A1 | 6/2002 | Brickell et al. | |
| 2002/0095360 | A1 | 7/2002 | Joao | |
| 2002/0103801 | A1 | 8/2002 | Lyons | |
| 2002/0116647 | A1 | 8/2002 | Mont et al. | |
| 2002/0178370 | A1 | 11/2002 | Gurevich et al. | |
| 2003/0061170 | A1 | 3/2003 | Uzo | |
| 2003/0126094 | A1 | 7/2003 | Fisher et al. | |
| 2003/0158960 | A1 | 8/2003 | Engberg | |
| 2003/0172090 | A1 | 9/2003 | Asunmaa et al. | |
| 2003/0217140 | A1 | 11/2003 | Burbeck et al. | |
| 2003/0218062 | A1 | 11/2003 | Noriega et al. | |
| 2004/0019571 | A1 | 1/2004 | Hurwitz et al. | |
| 2004/0034440 | A1 | 2/2004 | Middlebrook | |
| 2004/0128392 | A1* | 7/2004 | Blakley et al. | 709/229 |
| 2004/0162786 | A1 | 8/2004 | Cross et al. | |
| 2004/0199475 | A1 | 10/2004 | Rivest et al. | |
| 2004/0199787 | A1 | 10/2004 | Hans et al. | |
| 2004/0230831 | A1 | 11/2004 | Spelman et al. | |
| 2005/0027713 | A1 | 2/2005 | Cameron et al. | |
| 2005/0033692 | A1 | 2/2005 | Jarman et al. | |
| 2005/0044423 | A1 | 2/2005 | Mellmer et al. | |
| 2005/0091543 | A1 | 4/2005 | Holtzman et al. | |
| 2005/0097550 | A1 | 5/2005 | Schwabe et al. | |
| 2005/0124320 | A1 | 6/2005 | Ernst et al. | |
| 2005/0135240 | A1 | 6/2005 | Ozugur | |
| 2005/0229005 | A1 | 10/2005 | Le Saint et al. | |
| 2005/0247777 | A1 | 11/2005 | Pitroda | |
| 2005/0247797 | A1 | 11/2005 | Ramachandran | |
| 2005/0289080 | A1 | 12/2005 | Rhiando | |
| 2005/0289341 | A1 | 12/2005 | Ritola et al. | |
| 2006/0020679 | A1 | 1/2006 | Hinton et al. | |
| 2006/0136990 | A1 | 6/2006 | Hinton et al. | |
| 2006/0155993 | A1 | 7/2006 | Busboon | |
| 2006/0200424 | A1 | 9/2006 | Cameron et al. | |
| 2006/0206931 | A1 | 9/2006 | Dillaway et al. | |
| 2006/0224611 | A1 | 10/2006 | Dunn et al. | |
| 2006/0235796 | A1 | 10/2006 | Johnson et al. | |
| 2007/0016484 | A1 | 1/2007 | Waters et al. | |
| 2007/0016943 | A1* | 1/2007 | M'Raihi et al. | 726/9 |
| 2007/0043651 | A1 | 2/2007 | Xiao et al. | |
| 2007/0061567 | A1 | 3/2007 | Day et al. | |
| 2007/0118449 | A1 | 5/2007 | De La Motte | |
| 2007/0143835 | A1 | 6/2007 | Cameron et al. | |
| 2007/0192245 | A1 | 8/2007 | Fisher et al. | |
| 2007/0203852 | A1* | 8/2007 | Cameron et al. | 705/75 |
| 2007/0204168 | A1 | 8/2007 | Cameron et al. | |
| 2007/0204325 | A1 | 8/2007 | Cameron et al. | |
| 2007/0208869 | A1 | 9/2007 | Adelman et al. | |
| 2007/0208940 | A1 | 9/2007 | Adelman et al. | |
| 2007/0214079 | A1 | 9/2007 | Mears | |
| 2007/0214429 | A1 | 9/2007 | Lyudovyk et al. | |
| 2007/0282951 | A1 | 12/2007 | Selimis et al. | |
| 2007/0294431 | A1 | 12/2007 | Adelman et al. | |
| 2008/0003977 | A1 | 1/2008 | Chakiris et al. | |
| 2008/0010675 | A1 | 1/2008 | Massascusa et al. | |
| 2008/0071808 | A1 | 3/2008 | Hardt et al. | |
| 2008/0098228 | A1 | 4/2008 | Anderson et al. | |
| 2008/0140576 | A1 | 6/2008 | Lewis et al. | |
| 2008/0141339 | A1 | 6/2008 | Gomez et al. | |
| 2008/0141366 | A1 | 6/2008 | Cross et al. | |
| 2008/0162297 | A1 | 7/2008 | Hershkovitz et al. | |
| 2008/0178271 | A1 | 7/2008 | Gajjala et al. | |
| 2008/0178272 | A1 | 7/2008 | Gajjala et al. | |
| 2008/0184339 | A1* | 7/2008 | Shewchuk et al. | 726/3 |
| 2008/0189778 | A1* | 8/2008 | Rowley | 726/9 |
| 2008/0196096 | A1 | 8/2008 | Grynberg | |
| 2008/0222714 | A1 | 9/2008 | Wahl | |
| 2008/0229410 | A1* | 9/2008 | Felsted et al. | 726/20 |
| 2008/0235144 | A1 | 9/2008 | Phillips | |
| 2008/0244722 | A1* | 10/2008 | Satish et al. | 726/9 |
| 2008/0256594 | A1 | 10/2008 | Satish et al. | |
| 2008/0263644 | A1 | 10/2008 | Grinstein | |
| 2008/0289020 | A1* | 11/2008 | Cameron et al. | 726/9 |
| 2008/0301784 | A1 | 12/2008 | Zhu et al. | |
| 2008/0313567 | A1 | 12/2008 | Sabin et al. | |
| 2009/0013391 | A1 | 1/2009 | Ernst | |
| 2009/0037920 | A1 | 2/2009 | Brown et al. | |
| 2009/0077118 | A1 | 3/2009 | Doman et al. | |
| 2009/0077627 | A1 | 3/2009 | Doman et al. | |
| 2009/0089625 | A1 | 4/2009 | Kannappan et al. | |
| 2009/0089870 | A1* | 4/2009 | Wahl | 726/9 |
| 2009/0089871 | A1 | 4/2009 | Murphy et al. | |
| 2009/0099860 | A1 | 4/2009 | Karabulut et al. | |
| 2009/0125558 | A1 | 5/2009 | Suh | |
| 2009/0131157 | A1 | 5/2009 | Hedrick et al. | |
| 2009/0138398 | A1 | 5/2009 | Cole et al. | |
| 2009/0178112 | A1 | 7/2009 | Doman et al. | |
| 2009/0186701 | A1 | 7/2009 | Rowe et al. | |
| 2009/0199284 | A1 | 8/2009 | Sanders et al. | |
| 2009/0204542 | A1* | 8/2009 | Doman et al. | 705/50 |
| 2009/0204622 | A1 | 8/2009 | Sanders et al. | |
| 2009/0205014 | A1 | 8/2009 | Doman et al. | |
| 2009/0205035 | A1 | 8/2009 | Sermersheim et al. | |
| 2009/0216666 | A1 | 8/2009 | Antao et al. | |
| 2009/0241178 | A1 | 9/2009 | Burch et al. | |
| 2009/0249430 | A1 | 10/2009 | Buss et al. | |
| 2009/0251749 | A1 | 10/2009 | O'Boyle et al. | |
| 2009/0254476 | A1 | 10/2009 | Sharma et al. | |
| 2009/0254483 | A1 | 10/2009 | Barkan | |
| 2009/0260064 | A1 | 10/2009 | McDowell et al. | |
| 2009/0300512 | A1 | 12/2009 | Ahn | |
| 2009/0300714 | A1 | 12/2009 | Ahn | |
| 2009/0300747 | A1 | 12/2009 | Ahn | |
| 2009/0320095 | A1 | 12/2009 | Nanda et al. | |
| 2009/0328166 | A1* | 12/2009 | Burch et al. | 726/6 |
| 2010/0037303 | A1 | 2/2010 | Sharif et al. | |
| 2010/0274691 | A1 | 10/2010 | Hammad et al. | |
| 2011/0023103 | A1 | 1/2011 | Dietrich et al. | |

FOREIGN PATENT DOCUMENTS

| | | |
|---|---|---|
| JP | 11003382 | 1/1999 |
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Computer Security Institute; "What InfoCard Is and Isn't"; http://web.archive.org/web/20060423133 805/http://www.identityblog.com/wp-content/resources/alert.pdf, May 2006 (4 pages).

Cameron, Kim et al; "Design Rationale behind the Identity Metasystem Architecture"; http://www.identityblog.com/, http://research.microsoft.com/~mbj/; Mar. 16, 2006, pp. 1-11.

Chappell, David; "Introducing Windows CardSpace"; Windows Vista Technical Articles, http://msdn2.microsoft.com/en-us/library/aa480189(d=printer).aspx, Apr. 2006, pp. 1-15.

The Higgins Foundation; "Higgins FAQ"; http://www.eclipse.org/higgins/faq.php; printed Aug. 13, 2007; pp. 1-2.

Hoang et al.; "Secure Roaming with Identity Metasystems"; ACM 978-1-60558-006-1; http://portal.acm.org/citation.cfm?id=1373297; 2008, pp. 36-47.

"Components—Eclipsepedia"; http://wiki.eclipse.org/Components; printed Aug. 13, 2007; pp. 1-8.

"Architecture—Eclipsepedia"; http://wiki.eclipse.org/index.php/Architecture; printed Aug. 13, 2007; pp. 1-2.

U.S. Appl. No. 11/395,725, filed Mar. 31,2006, entitled "Methods and Systems for Multi-Factor Authentication"; This is a commonly owned application that is in the same general field as the invention.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft age+STS+RP&hl=en&ct=clnk&cd=2 &gl=us&client=firefox-a; MSDN Blogs; 2007, pp. 1-7.

"Identity Selector Interoperability Profile specification and companion guides"; Microsoft Download Center; http://www.microsoft.com/downloads/details.aspx?DisplayLang=en &FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/down load/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1 d31855cd2/Identity-Selector-Interop-Profile-v1-Guide.pdf; Microsoft Corporation; Apr. 2007, pp. 1-74.

Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5,2005; Chapter 8, pp. 147-160.

"PwdHash From Stanford—Generate Passwords by Hashing the URL"; Don't Learn to Hack—Hack to Learn, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/deven v/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 22 20, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1 &article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, 26 XP002517145.

Cameron, K., "Bill Gates, Inforcards and the Identity Metasystem", Internet Article, http://www.identityblog.com/?p=374>, Feb. 19, 2006, 27 XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 2005), "A Guide to Integrating with InfoCard v1.0", XP007908505, pp. 1-62.

Gralla, Preston; "How the Internet Works"; Millennium Ed. Que, Aug. 1, 1999.

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part I)", Internet Article, http://www.codeproject.com/KB/scripting/DragDrip_ Part_1_.aspx, Jun. 11, 2006 (12 pages).

Jones, Michael B.; A Guide to Supporting Information Cards within Web Applications and Browers as of the Information Card Profile V1.0; Microsoft Download Center; http://msdn.microsoft.com/en-us/library/aa480726.aspx; Dec. 2006, pp. 1-13.

White, "How Computers Work, Millennium Edition", 1999, Que Corporation.

Gevers et al., Enhancing Privacy in Identity Management Systems, WPES '07, ACM, Oct. 2007 (4 pages).

* cited by examiner

CARDSPACE HISTORY VALIDATOR

RELATED APPLICATION DATA

This application is related to co-pending U.S. patent application Ser. No. 11/843,572, filed Aug. 22, 2007, to co-pending U.S. patent application Ser. No. 11/843,638, filed Aug. 22, 2007, to co-pending U.S. patent application Ser. No. 11/843,640, filed Aug. 22, 2007, and to co-pending U.S. patent application Ser. No. 12/029,373, filed Feb. 11, 2008, all of which are herein incorporated by reference for all purposes. Co-pending U.S. patent application Ser. No. 11/843,572, filed Aug. 22, 2007, co-pending U.S. patent application Ser. No. 11/843,638, filed Aug. 22, 2007, and co-pending U.S. patent application Ser. No. 11/843,640, filed Aug. 22, 2007, all claim the benefit of U.S. Provisional Patent Application Ser. No. 60/895,312, filed Mar. 16, 2007, U.S. Provisional Patent Application Ser. No. 60/895,316, filed Mar. 16, 2007, and U.S. Provisional Patent Application Ser. No. 60/895,325, filed Mar. 16, 2007, all of which are herein incorporated by reference for all purposes.

FIELD OF THE INVENTION

This invention pertains to using information cards, and more particularly to being able to identify if an information card was fraudulently used.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

While this system simplifies the management of information used to satisfy the requests of service providers, there are potential problems. Service providers change the information they request from users only infrequently. A third party might be able to monitor the service provider's request for information from the user and capture that information (as delivered from the identity provider to the user or from the user to the service provider). The third party would then be in a position to spoof the identity of a legitimate user of the services offered by the service provider, by providing the information previously captured. There might also be other ways in which a third party could spoof a user's identity sufficiently to gain access to the service provider's services, with the service provider thinking it is interacting with the user.

A need remains for a way to addresses these and other problems associated with the prior art.

SUMMARY OF THE INVENTION

In an embodiment of the invention, a client and a relying party can verify that they agree as to when the client last accessed the relying party's services. One of the client and the relying party can provide to the other the last time a particular information card of the client was used to access the service. This information can be compared against the information stored by the other party. If the information corresponds, then the last use of the information card is verified; otherwise, a potentially fraudulent access of the relying party's services might have occurred.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
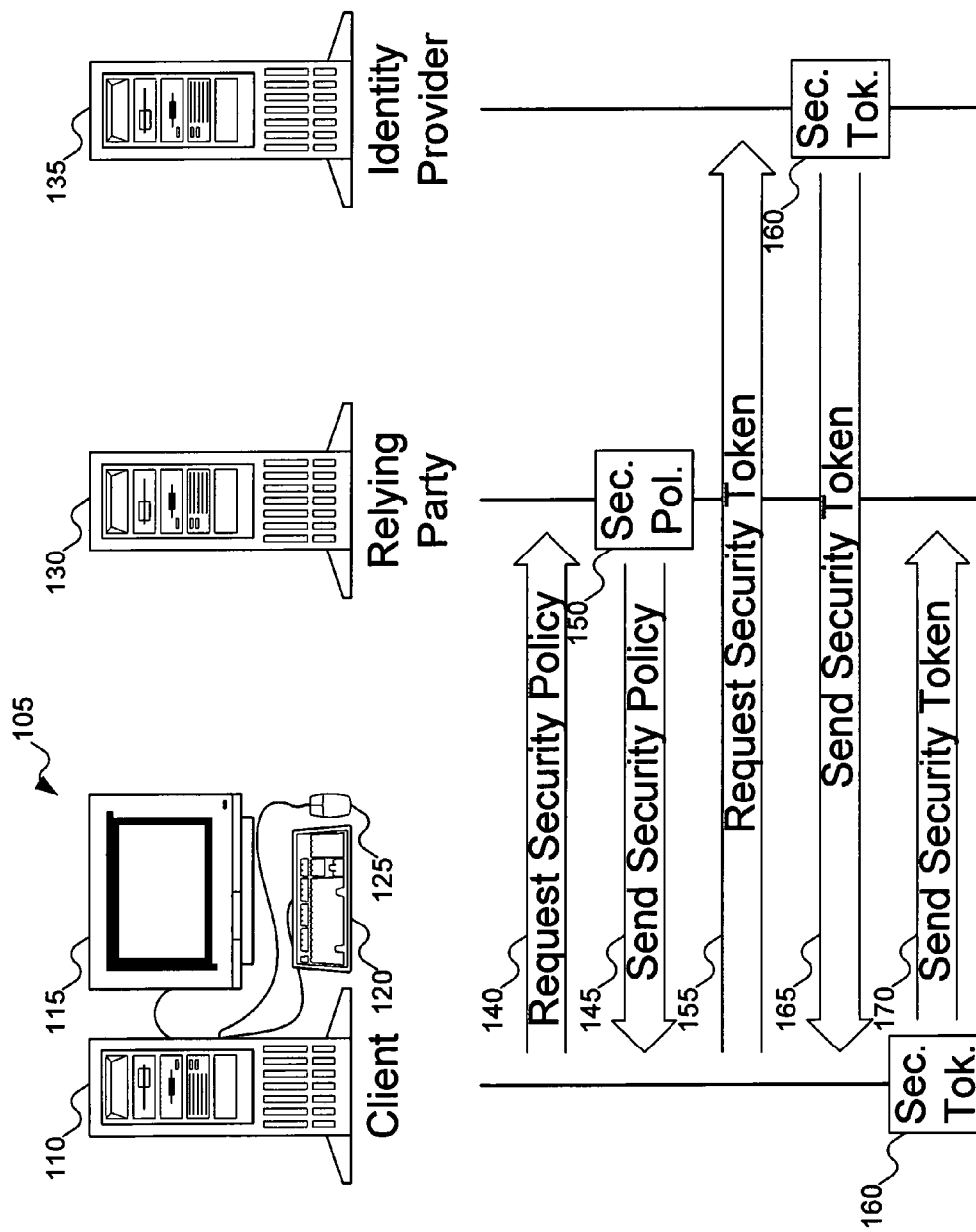
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) may be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105: for example, a central processing unit, memory, storage, etc. Although not shown in FIG. 1, a person skilled in the art will recognize that computer system 105 can interact with other computer systems, such as relying party 130 and identity provider 135, either directly or over a network (not shown in FIG. 1) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web at http://msdn2.microsoft.com/en-us/library/aa480189.aspx and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a user's e-mail address, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that if a third party is able to successfully spoof the user's identity, there is no way to detect that this spoofing occurred. For example, if security token 160 omits a time-stamp from identity provider 135, a third party can later provide a copy of security token 160 to relying party 130. The copy of security token 160 will appear proper, and relying party 130 can accept it, even though security token 160 is not coming from the client.

Figure 2A:
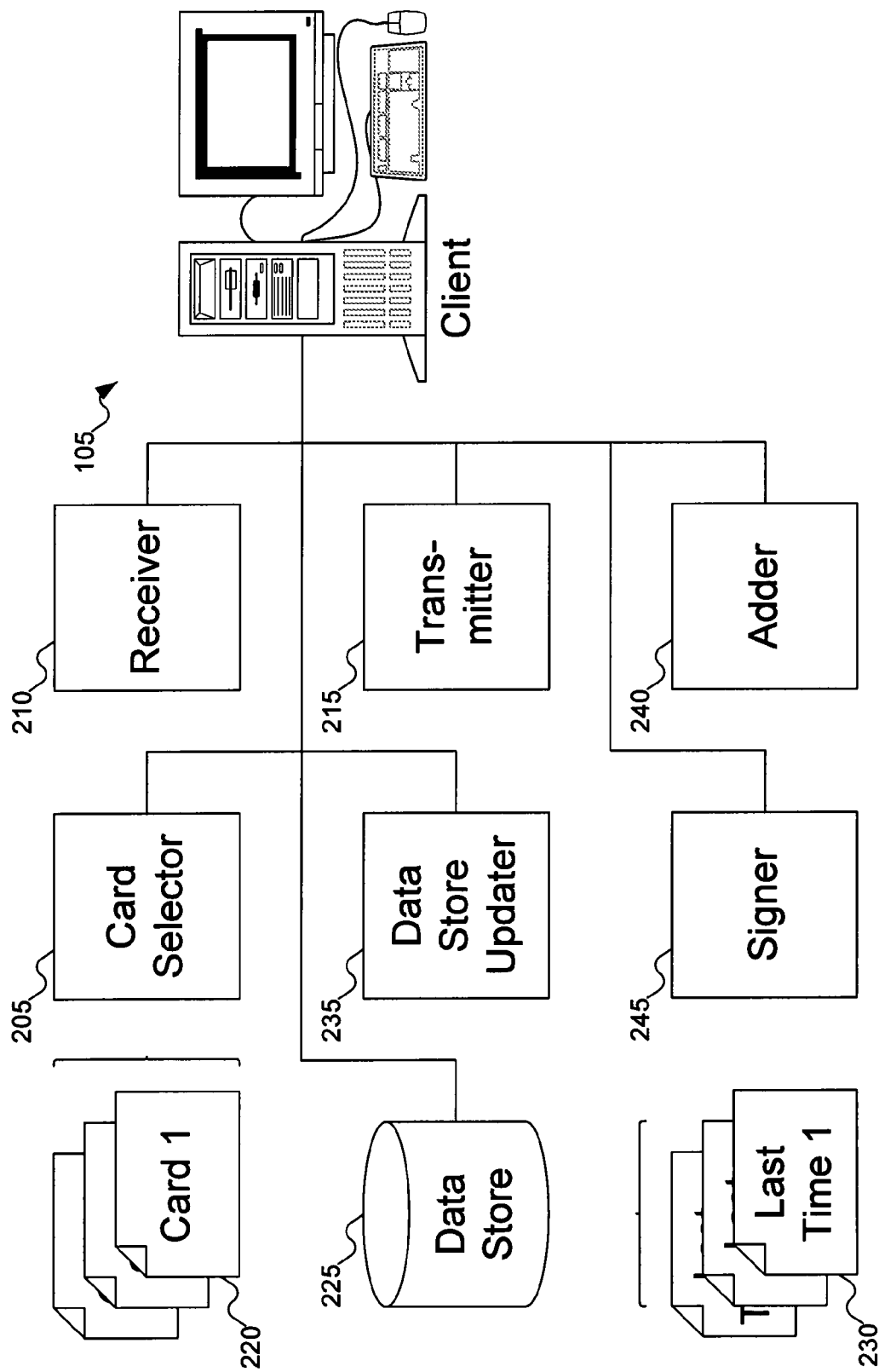
FIGS. 2A-2B show the client of FIG. 1 equipped to perform or assist in a verification of the last time an information card was used to access a service of a relying party, according to an embodiment of the invention.
Figure 2B:
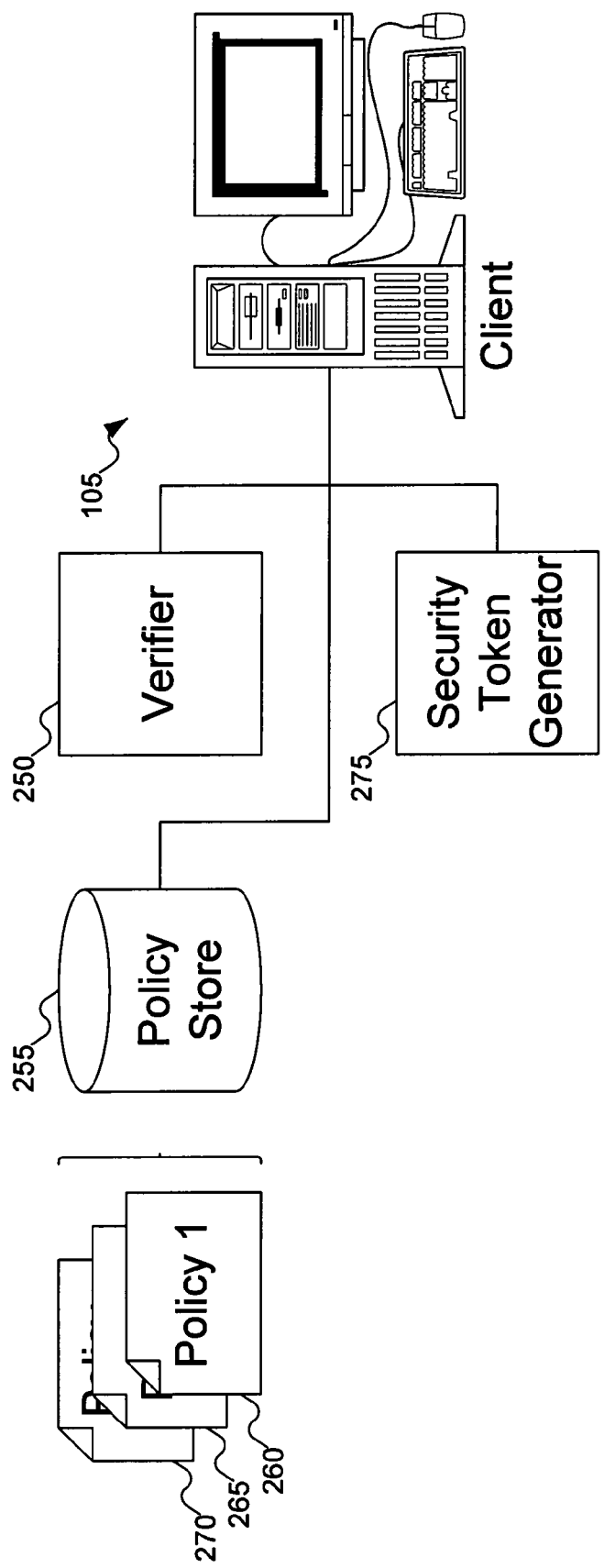

Now that the problem—being able to detect when relying party 130 has granted access improperly based on a user's information—is understood, embodiments of the invention can be explained. FIGS. 2A-2B show the client of FIG. 1 equipped to perform or assist in a verification of the last time an information card was used to access a service of a relying party, according to an embodiment of the invention. In FIG. 2A, computer system 105 includes card selector 205, receiver 210, and transmitter 215. Card selector 205 enables a user to select information card 220 that satisfies the security policy. Receiver 210 receives data transmitted to computer system 105, and transmitter 215 transmits information from computer system 105. These components are the same as those found in computer system 105 as shown in FIG. 1.

In addition to these components, computer system 105 includes data store 225, which information about last use 230 of the security token (at least, by computer system 105). Last use 230 can take any desired form: for example, last use 230 can specify that the security token was last used in some defined interval ("not before date/time X, and not after date/time Y"), or can record a time as specified by some machine on a network. If it turns out that the same security token is used by multiple relying parties (which can occur if the security policy requests only commonly requested data: for example, a user's e-mail address), last use 230 can also associate the identity of the relying party with the last use of the security token. This additional information avoids the possibility that the last use of the security token by computer system 105 was to access a resource of a different relying party (which the target relying party would not know about).

Computer system 105 also includes data store updater 235, which updates data store 225 based on a current use of information card 220. Adder 240 adds last use 230 to a security token for transmission to the relying party. Finally, signer 245 provides a digital signature for the security token (to which last use 230 has been added by adder 240), so that the relying party can verify that the security token has not been tampered with. Although signer 245 is described as providing a digital signature for the security token, a person skilled in the art will recognize that signer 245 can operate in any desired manner that provides relying party with some assurance that the security token was not tampered with. A person skilled in the art will also recognize that signer 245 is optional, if the relying party does not need assurance as to the source of the security token.

In FIG. 2B, computer system 105 is shown as also including verifier 250. Verifier 250 verifies that the last use of the security token was by computer system 105. Verifier 250 is used when computer system 105 performs the verification, rather than the relying party. In general, computer system 105 has a trust relationship with the relying party (as exemplified by the past transactions between the parties); computer system 105 providing the last use of the security token to the relying party does not release any information the relying party does not already know. But in situations where the client does not trust the relying party to properly verify the source of the security token, computer system 105 can perform the verification itself.

Even where computer system 105 trusts the relying party, computer system 105 might not trust other machines on the network. For example, an eavesdropper might be intercepting communications between computer system 105 and the relying party, in the hopes of obtaining enough information to later fool the relying party into believing the eavesdropper is actually the client. The relying party might know the last time the security token was used, but other parties do not (or should not) know that information. In some embodiments of the invention, computer system 105 can encrypt the data transmitted to the relying party, in addition to (or instead of) signing the security token. In such an embodiment, computer system 105 also includes an encrypter (not shown in FIG. 2A).

Computer system 105 also includes policy store 255, which stores policies 260, 265 and 270, and security token generator 275. Policies 260, 265, and 270 define different policies to be applied if the last use of the security token was not verified. Among the various possibilities for policies that can be applied are: denying the client access to the resource; informing the user about a potentially fraudulent use of the security token; and informing an administrator (e.g., of the relying party or the identity provider) about the potentially fraudulent use of the security token; a person skilled in the art will recognize other possible policies that can be applied if a security token is not verified. Security token generator 275 generates a security token at computer system 105. Security token generator 275 generates a security token, when the security token is not generated by an identity provider. For example, security token generator 275 can generate a security token for a self-issued information card.

Figure 3:
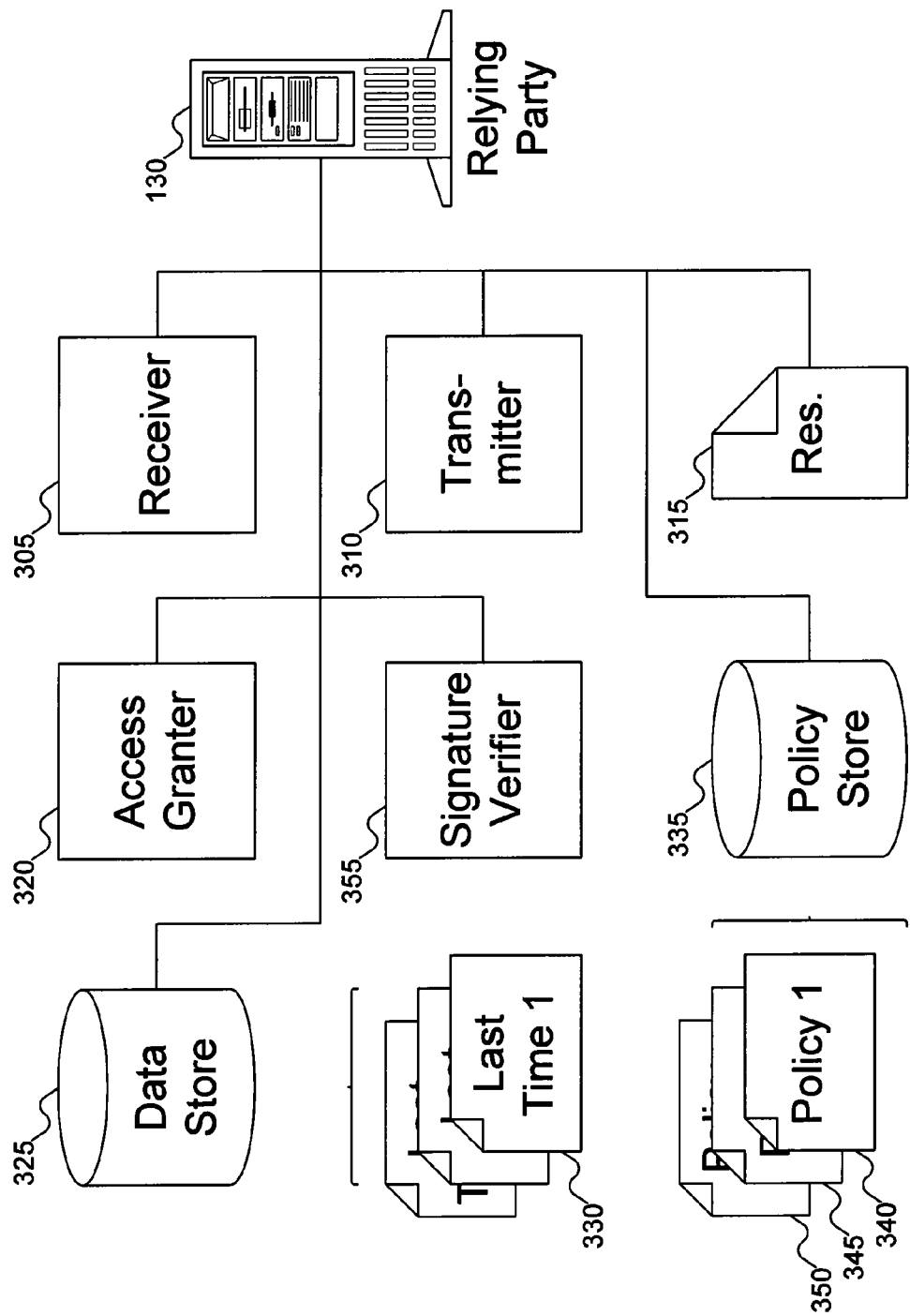
FIG. 3 shows the relying party of FIG. 1 equipped to perform or assist in a verification of the last time an information card was used to access a service of a relying party, according to an embodiment of the invention.

In contrast to FIGS. 2A-2B, which show aspects of the client, FIG. 3 shows the relying party of FIG. 1 equipped to perform or assist in a verification of the last time an information card was used to access a service of a relying party, according to an embodiment of the invention. In FIG. 3, relying party 130 includes receiver 305 and transmitter 310 for receiving information at and transmitting information from replying party 130. Relying party 130 also includes resource 315, which is a resource to which the client seeks access. A person skilled in the art will recognize that resource 315 can take any number of forms: for example, a database or file which the client wants to view and/or edit, a web site with which the client wishes to engage in a transaction, and so on. A person skilled in the art will also recognize that resource 315 can take less recognizable forms: for example, relying party 135 can be an authentication server that the client wants to use to authenticate a user (in which case resource 315 can be thought of as the part of relying party 135 which performs the authentication of the user). Relying party 135 grants the client access to resource 315 using access granter 320, provided that the client satisfies the security policy (not shown in FIG. 3) of relying party 135. Access granter 320 can be considered the analog of verifier 250 of FIG. 2B, when relying party 135 performs verification of the last use of the security token.

Relying party includes data store 325, which stores last use 330 of the security token in question by the client to access resource 315. Relying party 135 can also include policy store 335, which stores policies 340, 345, and 350, which operate similarly to policies 260, 265, and 270 of FIG. 2B when the client includes policy store 255.

In FIGS. 2-3, regardless of whether the verification is performed at client 105 or relying party 135, the process of verification is straightforward. Once the party performing the verification has the record of the last use of the security token by the client (as received from the other party), the verifying party can access its data store and compare the records. If the records match, then client 105 is verified as having last provided the security token to relying party 135. If not, then the security token was last provided from some machine other than client 105, which leads to the potential conclusion that the last use of the security token was fraudulent.

In embodiments where relying party 135 performs the verification of the last use of the security token by client 105, as described above with reference to FIGS. 2-3, relying party 135 is not limited to requesting only the (most recent) last time that client 105 sent the security token. For example, relying party 135 can request that client 105 provide the last five times client 105 provided the security token to relying party 135. Or, relying party 135 can request only the third most recent time client 105 sent the security token to relying party 135. A person skilled in the art will recognize other types of requests relying party 135 might make of client 105 to verify client 105.

In embodiments where client 105 performs the verification of the last use of the security token, relying party 135 can provide to client 105 its last recorded receipt of the security token when it transmits the security policy, or relying party 135 can provide this information to client 105 upon request. But both of these embodiments have drawbacks. The possibility exists that the party with which relying party 135 is communicating is not client 105, but rather a party intent on stealing the identity of client 105. In that case, the defrauding party will likely return a positive result of the "verification", without performing any true verification. Whether relying party 135 provides the last use information to client 105 voluntarily or in response to a request from client 105, the transmission of this information to client 105 potentially gives a defrauding party information it otherwise might not have, and should not have. In addition, the information card model described above does not normally permit client 105 to request information from relying party 135 in this manner, which would require a new form of interaction between client 105 and relying party 135.

Figure 4:
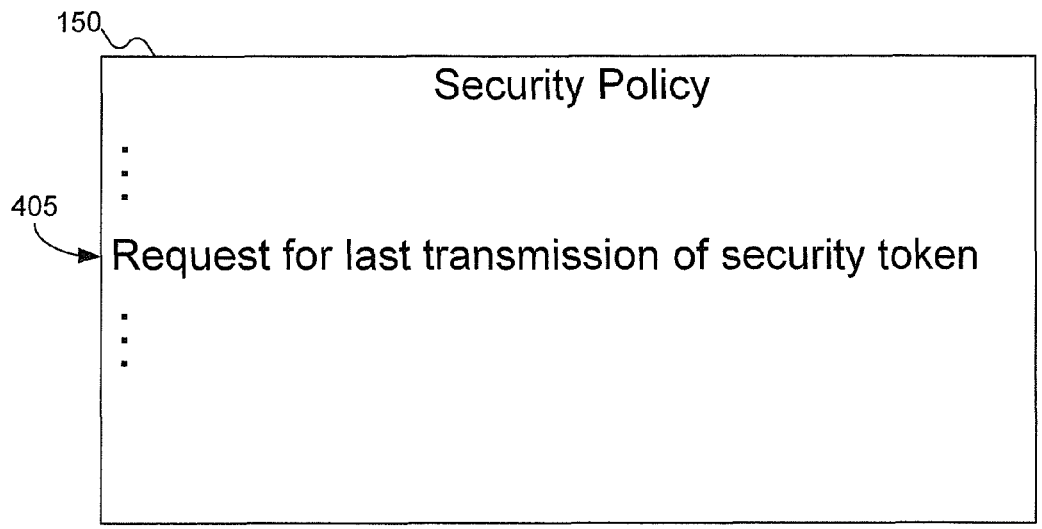
FIG. 4 shows the security policy of FIG. 1 including a request for the last time the client transmitted the security token of FIG. 1 to the relying party.

FIG. 4 shows the security policy of FIG. 1 modified to include a request for the last time the client transmitted the security token of FIG. 1 to the relying party. In FIG. 4, security policy 150 includes request 405 that the client include in the security token the last time the client sent the security token to the relying party. The resulting security token in shown in FIG. 5, where security token 160 is shown as including last time 505 the client sent the security token to the relying party. Security token 160 is also shown as including digital signature 510; a person skilled in the art will recognize that digital signature 510 can be omitted, if the relying party otherwise trusts that security token 160 comes from the client (for example, if the client and the relying party are communicating using encrypted messages, or if the relying party has other reasons to trust that security token 160 comes from the client).

Figure 5:
FIG. 5 shows the security token of FIG. 1 including information to support verifying the last time the client transmitted the security token to the relying party.

Not shown in FIGS. 4-5 are the modifications that occur when the relying party provides the last use information to the client for client verification. As described above, relying party 135 can include this information with the security policy, or can transmit this information in response to a request from the client. In embodiments where the security tokens are verified before the client selects the information card (and thus before the security token is generated), the relying party can include in the security policy information about the last use of every security token the relying party received from the client. Such information can also be transmitted separately from the security policy, and can be transmitted responsive to a request from the client.

In embodiments where the client performs verification, there is no need to modify the security token: if the client detects a potentially fraudulent use of the security token sufficient to prevent the transaction, the client will not send the security token to the relying party (although the client might inform the relying party about the detected fraudulent use of the security token). Contrariwise, if the client sends the security token to the relying party, the relying party can conclude that it is OK to complete the transaction with the client.

Regardless of whether the client or the relying party verifies the last use of the security token, if a potentially fraudulent use of the security token is detected, it can be important to inform the user of that fact. While a simple message to the user can be enough, other possibilities exist. For example, co-pending U.S. patent application Ser. No. 12/029,373, titled "VISUAL AND NON-VISUAL CUES FOR CONVEYING STATE OF INFORMATION CARDS, ELECTRONIC WALLETS, AND KEYRINGS", filed Feb. 11, 2008, and incorporated by reference herein, describes how visual and non-visual cues can be presented to the user about the state of information cards. Embodiments of the invention can employ visual and non-visual cues as described in this related application to inform the user about the potentially fraudulent use of the security token.

Figure 6:
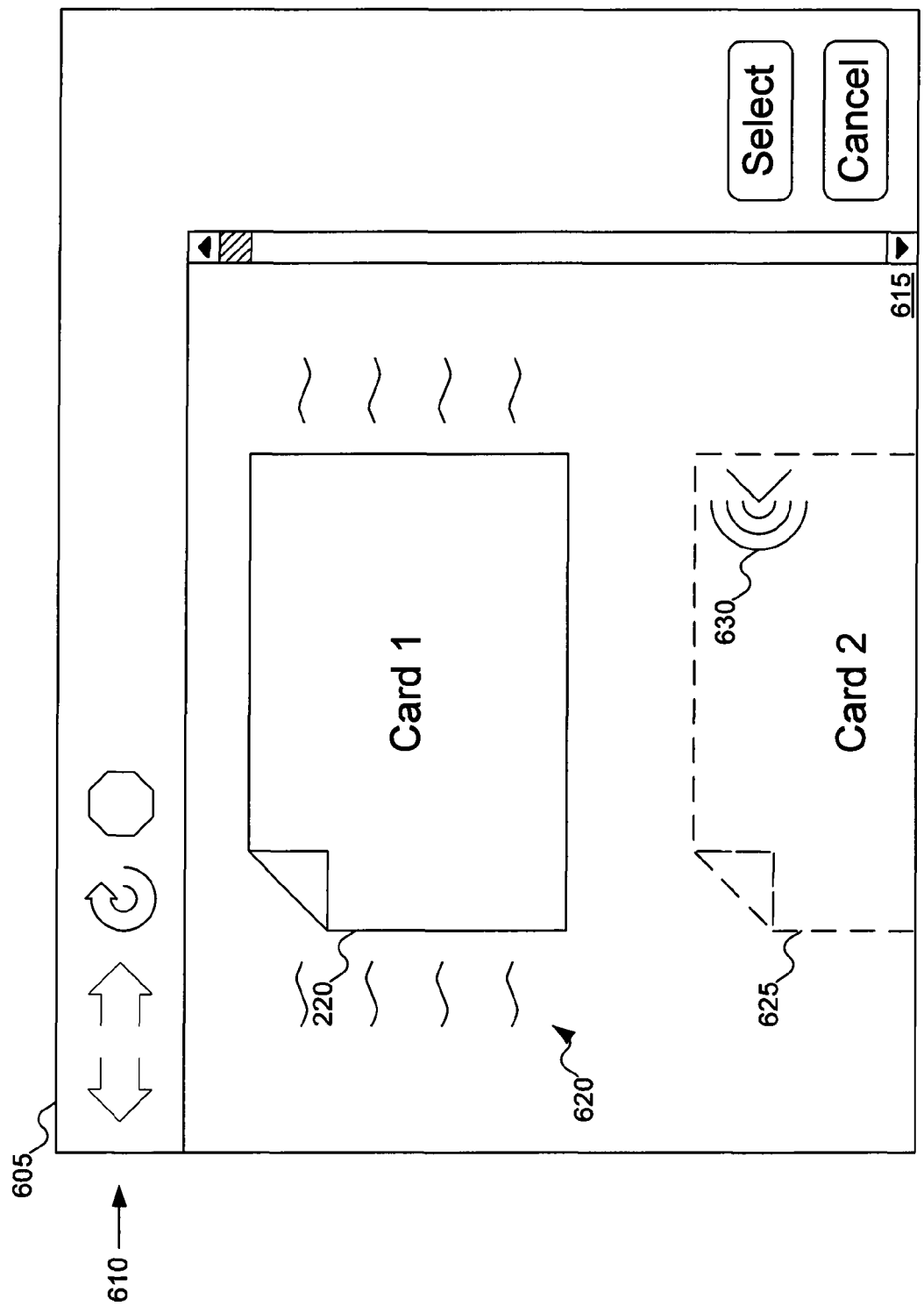
FIG. 6 shows the card selector of FIG. 2 presenting the client with visual and/or non-visual cues about which information cards are verified.

FIG. 6 shows the card selector of FIG. 2 presenting the client with visual and/or non-visual cues about which information cards are verified, according to an embodiment of the invention employing co-pending U.S. patent application Ser. No. 12/029,373, titled "VISUAL AND NON-VISUAL CUES FOR CONVEYING STATE OF INFORMATION CARDS, ELECTRONIC WALLETS, AND KEYRINGS", filed Feb. 11, 2008. In FIG. 6, the card selector of FIG. 2 shows screen 605, which shows what card selector 205 might display to the user. Among other options, screen 605 can include navigation buttons 610, to permit the user to navigate around within card selector 205. Screen 605 can also include a main area 615, where cards can be displayed to the user.

In main area 615, one card (and a portion of a second card) are shown. Information card 220 is shown with "scent lines" 620, which indicates to the user that information card 220 "smells": that is, is not an ideal information card. These "scent lines" can represent that the last use of the security token based on information card 220 with the relying party is not verified. Similarly, information card 625 is shown with a non-visual cue 630, which can be an alarm, also indicating that the security token based on information card 625 is also questionable. A person skilled in the art will recognize that, aside from "scent lines" and alarm cues, any other visual and/or non-visual cues can be used: the "scent lines" and alarm cues shown in FIG. 6 are merely exemplary.

A question that might be raised is how card selector 205 can present to the user such visual cues, if the security token has to have been generated before the last use can be verified (and thus before visual and/or non-visual cues can be presented to the user). There are multiple answers to this question. First, the client can recall whether there was a problem verifying a previous use of the security token. If there was an earlier problem, the client can provide the user with visual and/or non-visual cues regarding this prior situation. Second, in another embodiment of the invention, the client and relying party can "pre-verify" security tokens, before they are issued. For example, if the client were to keep a copy of a security token locally, even though that security token would no longer be accepted by the relying party (because the current time is outside the defined interval for acceptable use of the security token), the client and relying party can agree in advance whether a new security token with an acceptable defined interval would be considered verified. Or, if the client performs the verification, the relying party can transmit to the client all information about security tokens it has accepted from the client, and the client can individually verify them all, then provide the user with visual and/or non-visual cues regarding potential fraud based on those security tokens. A person skilled in the art will recognize other ways in which visual and/or non-visual cues can be used to inform the user about potential fraud, even before the security token is generated and transmitted to the relying party.

In the discussion above, the relying party and the client might send more than just the security policy and the security token to each other. Put another way, the client and the relying party might exchange multiple messages before the relying party grants the client access to the resource. Such messages can be handed with any desired level of security: they can be sent in the open, encrypted, digitally signed, or otherwise protected to either party's level of interest.

FIGS. 7A-7D show a flowchart of a procedure for the client of FIG. 1 to interact with the relying party to verify the last time the client sent the security token to the relying party.

Figure 7A:
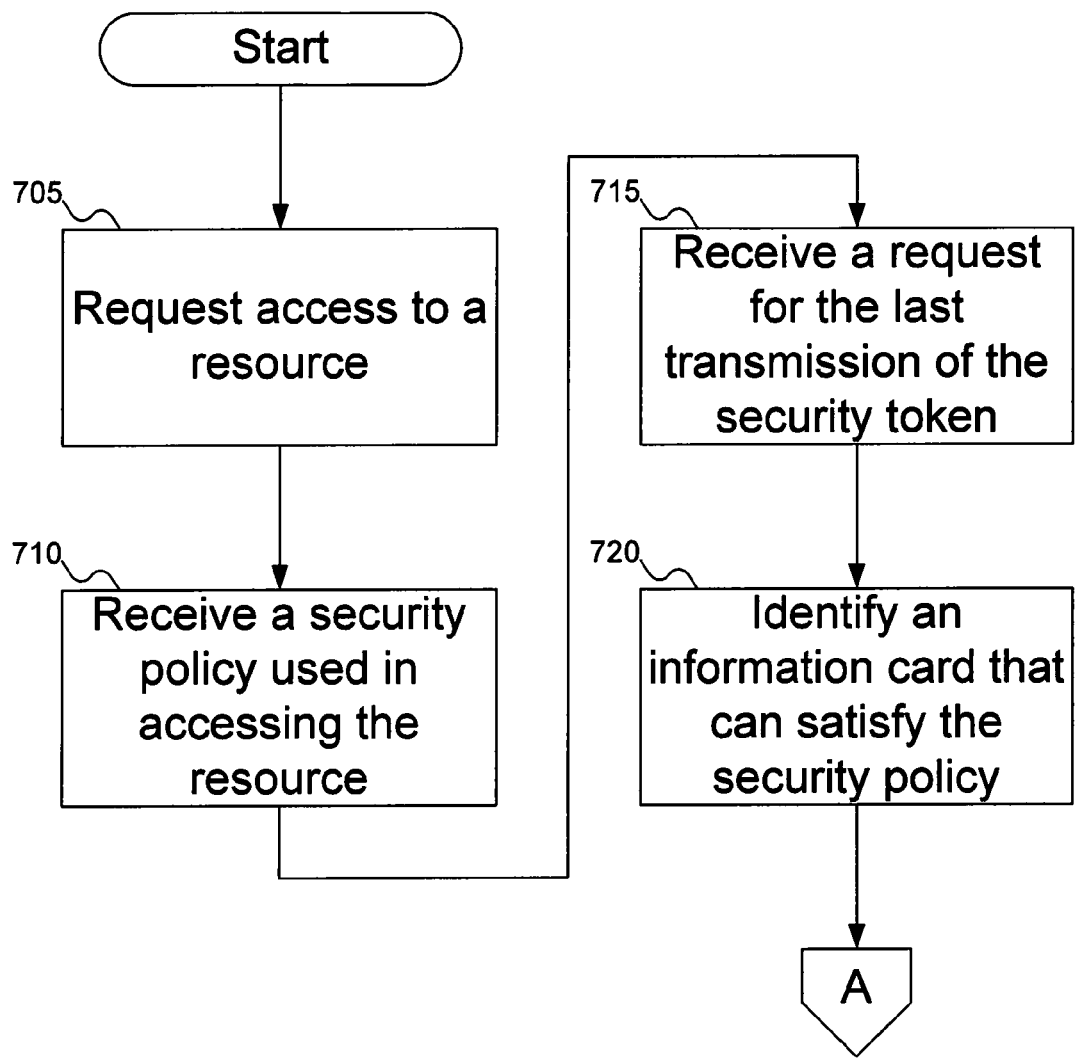
FIGS. 7A-7D show a flowchart of a procedure for the client of FIG. 1 to interact with the relying party to verify the last time the client sent the security token to the relying party.
Figure 7B:
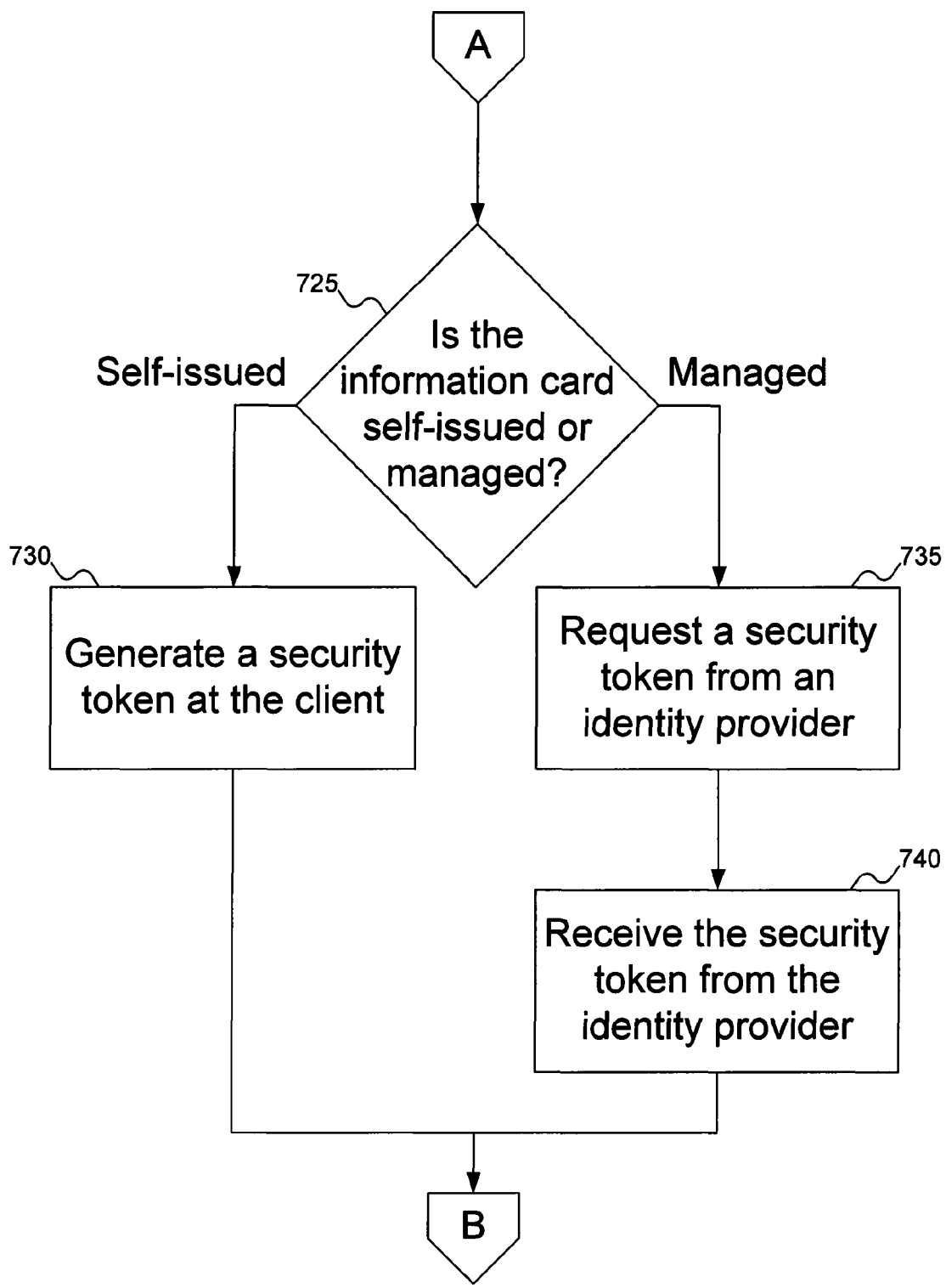
Figure 7C:
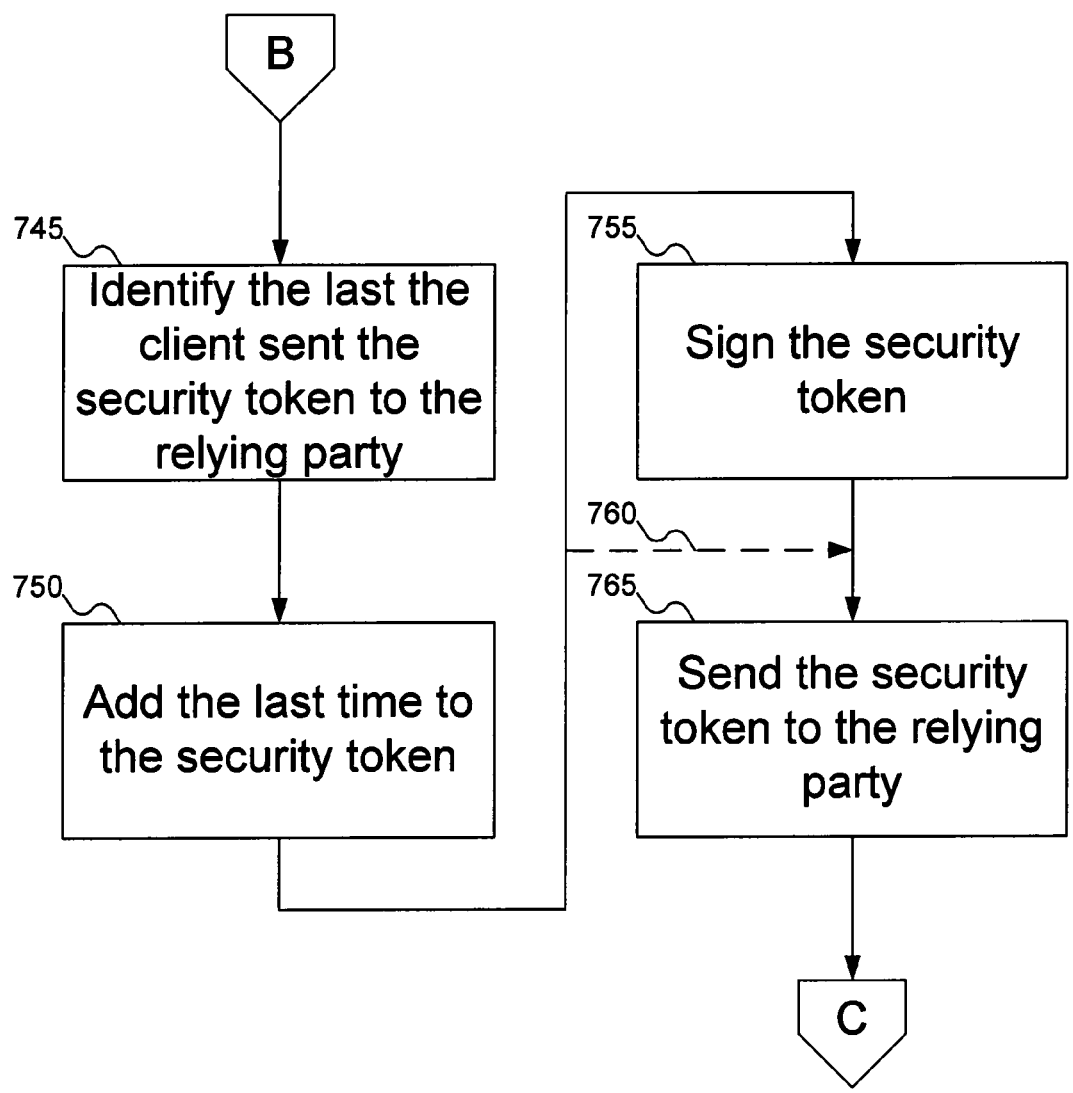
Figure 7D:
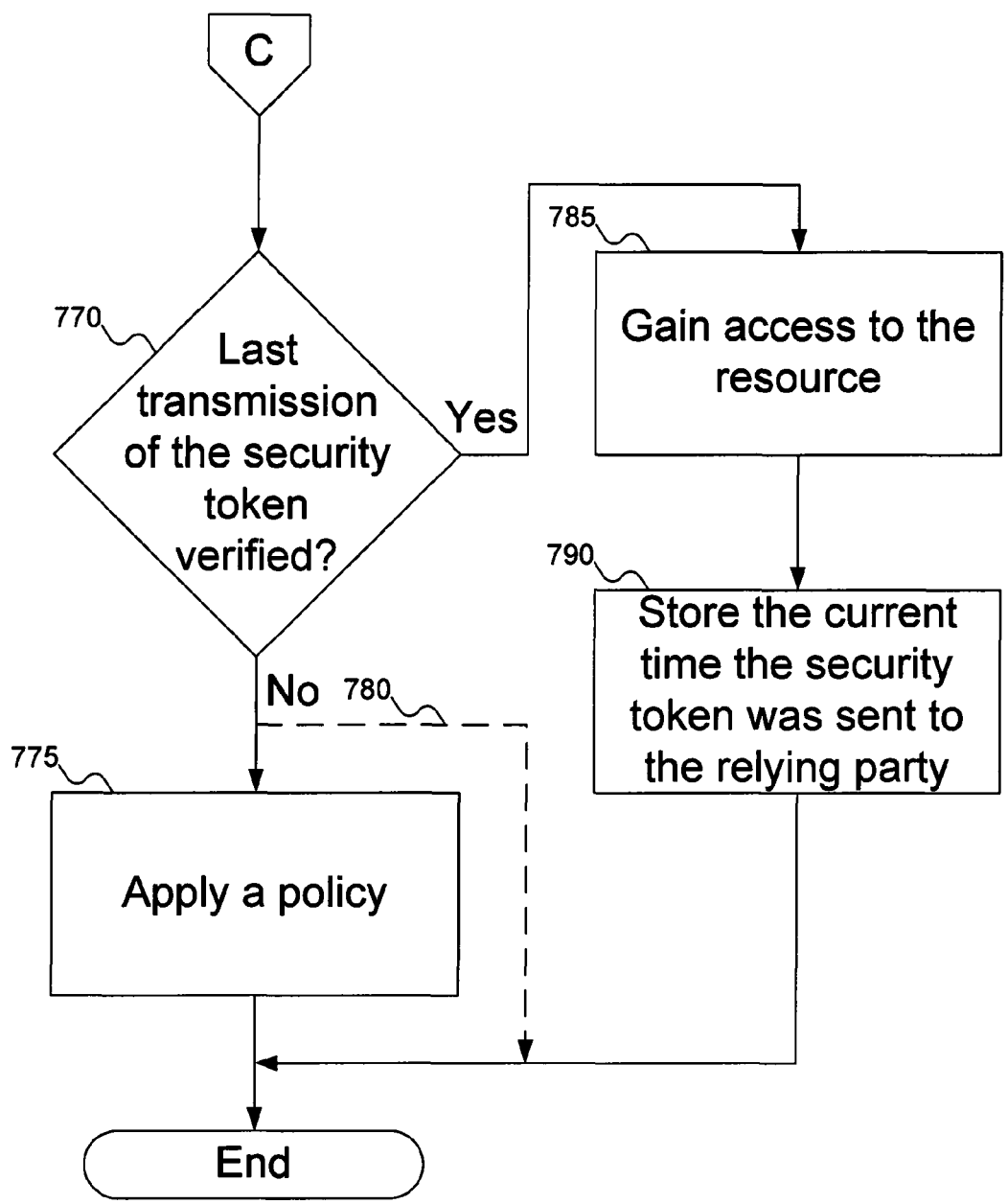

FIGS. 7A-7D represent operations from the perspective of the client. In FIG. 7A, at block 705, the client requests access to a resource of the relying party. At block 710, the client receives a security policy that the relying party wants satisfied before it will grant access to the resource. At block 715, the client receives a request for the last time the client sent the security token to the relying party. At this point, the client has yet to identify the security token: this request is part of the verification system, and relates to whatever security token the client eventually sends to the relying party. As discussed above with reference to FIG. 4, this request can be part of the security policy sent by the relying party. At block 720, the client identifies an information card that can satisfy the security policy.

At block 725 (FIG. 7B), the system determines whether the identified information card is self-issued or managed (e.g., by an identity provider). If the identified information card is self-issued, then at block 730, the client generates a security token for the information card. Otherwise at block 735, the client requests a security token from the manager of the information card; this security token is received by the client at block 740.

Regardless of whether the identified information card is self-issued or managed, at block 745, the client identifies the last time the security token was sent to the relying party. The client can access this information from data store 225 (of FIG. 2A). At block 750, the client adds to the security token the last time the security token was sent to the relying party. If the identified information card is a managed information card, then the security token might already have a digital signature applied to it; the client cannot remove the digital signature (generated by the identity provider) without weakening the value of the security token, so the digital signature will no longer match the security token. But at block 755, the client can apply its own digital signature to the security token. As discussed above with reference to FIG. 2A this is optional, and block 755 can be omitted, as shown by dashed line 760. At block 765, the client sends the security token, with the added last use information, to the relying party.

At block 770 (FIG. 7D), the client determines whether the last use of the security token was verified or not (that is, the client receives from the relying party an indication whether the last use of the security token was verified or not). If the last use of the security token was not verified, then at block 775, the client can apply a policy to address the potential fraud. Block 775 can be omitted—for example, if the client does not apply policies in such situations—as shown by dashed line 780. Otherwise, at block 785, the client receives access to the resource, and at block 790, the client stores the current time that the security token was sent to the relying party (for use the next the relying party wants to verify the client).

Figure 8A:
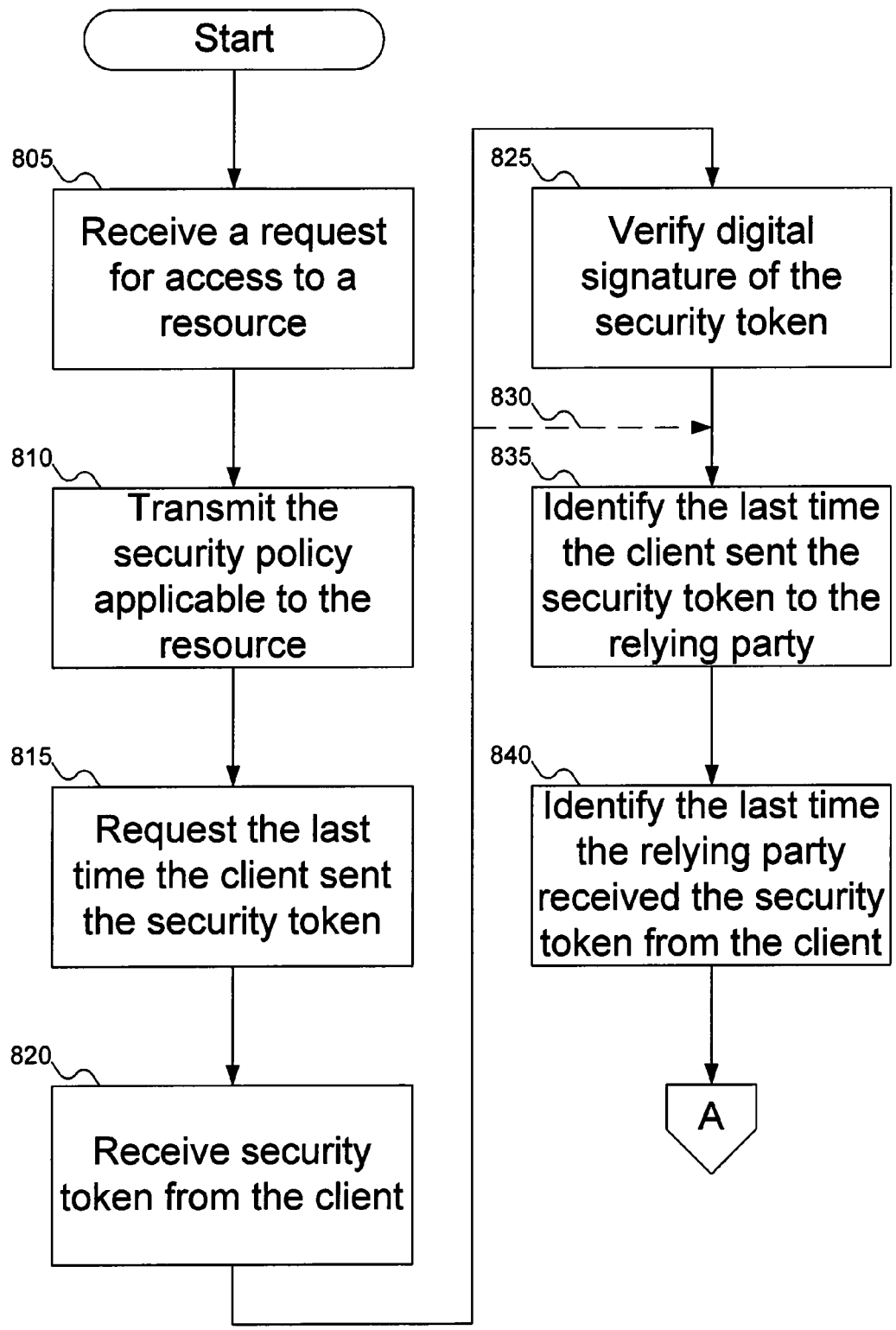
FIGS. 8A-8B show a flowchart of a procedure for the relying party of FIG. 1 to verify the last time the client sent the security token to the relying party.
Figure 8B:
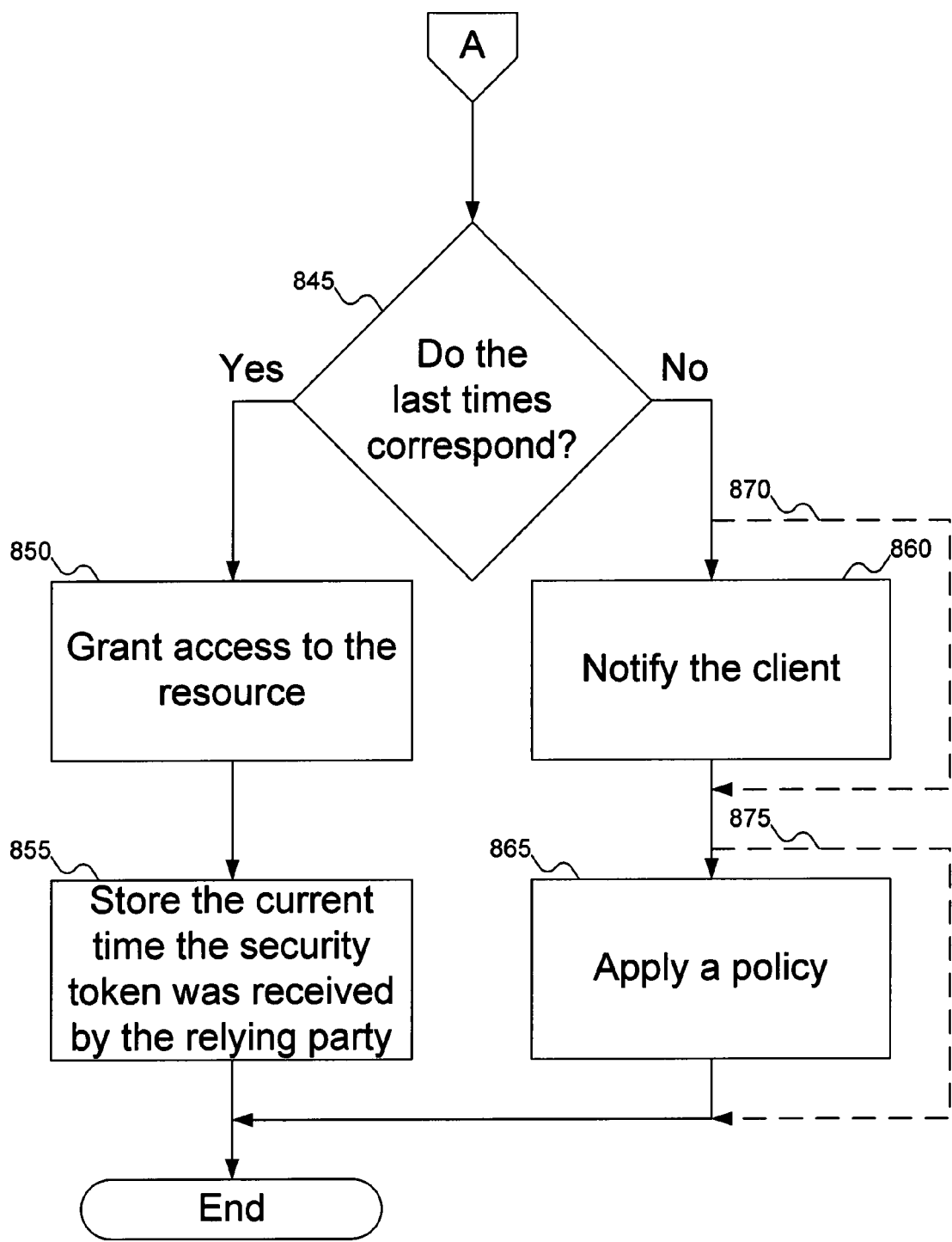

FIGS. 8A-8B show a flowchart of a procedure for the relying party of FIG. 1 to verify the last time the client sent the security token to the relying party. In FIG. 8A, at block 805, the relying party receives a request to access a resource. At block 810, the relying party sends the security policy that is to be satisfied to access the resource. At block 815, the relying party requests from the client the last time the client sent the security policy to the relying party. As discussed above with reference to FIG. 4, this request can be part of the security policy, rather than a separate request. At block 820, the relying party receives the security token from the client. At block 825, the relying party verifies the security token has not been tampered with by verifying the digital signature. If a digital signature is not used, block 825 can be omitted, as shown by dashed line 830. At block 835, the relying party identifies the last time the client sent the security token to the relying party by examining the security token; this information was added to the security token by the client. At block 840, the relying party identifies the last time it received the security token from the client. The relying party can access this information from data store 325 (of FIG. 3).

At block 845 (FIG. 8B), the relying party determines whether the last times correspond. If they do, then at block 850, the relying party grants the client access to the resource, and at block 855, the relying party stores the current time the relying party received the security token (for use in the next verification). Otherwise, at block 860, the relying party notifies the client that the last transmission of the security token could not be verified, and at block 865 the relying party applies a policy to address the potential fraud. Blocks 860 and 865 can be omitted, as shown by dashed lines 870 and 875.

Figure 9:
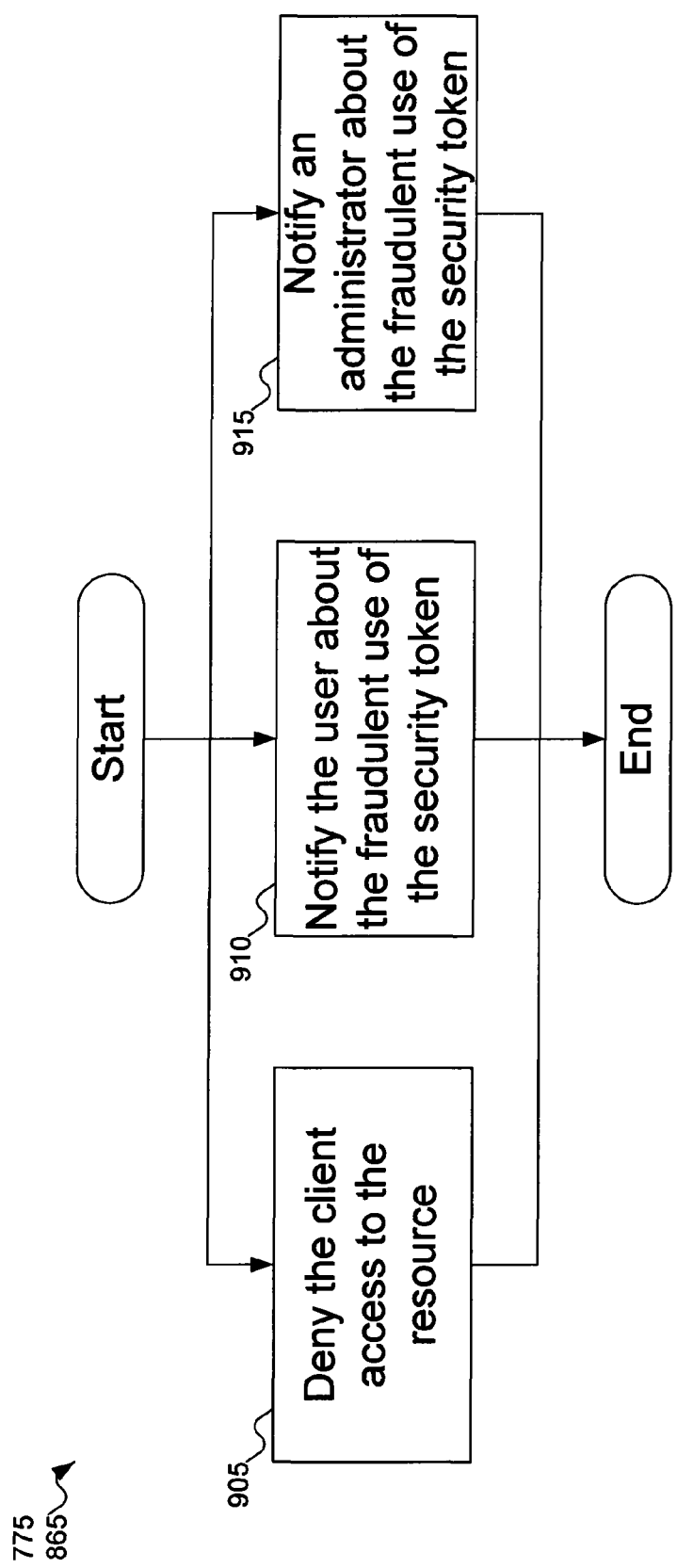
FIG. 9 shows a flowchart of a procedure for applying policies by the client or relying party of FIG. 1 when the last time the client sent the security token to the relying party is not verified.

FIG. 9 shows a flowchart of a procedure for applying policies by the client or relying party of FIG. 1 when the last time the client sent the security token to the relying party is not verified. In FIG. 9, at block 905, the policy can indicate that the client should be denied access to the resource. At block 910, the policy can indicate that a user should be notified about the potentially fraudulent use of the security token. And at block 915, the policy can indicate that an administrator should be notified about the potentially fraudulent use of the security token.

Figure 10A:
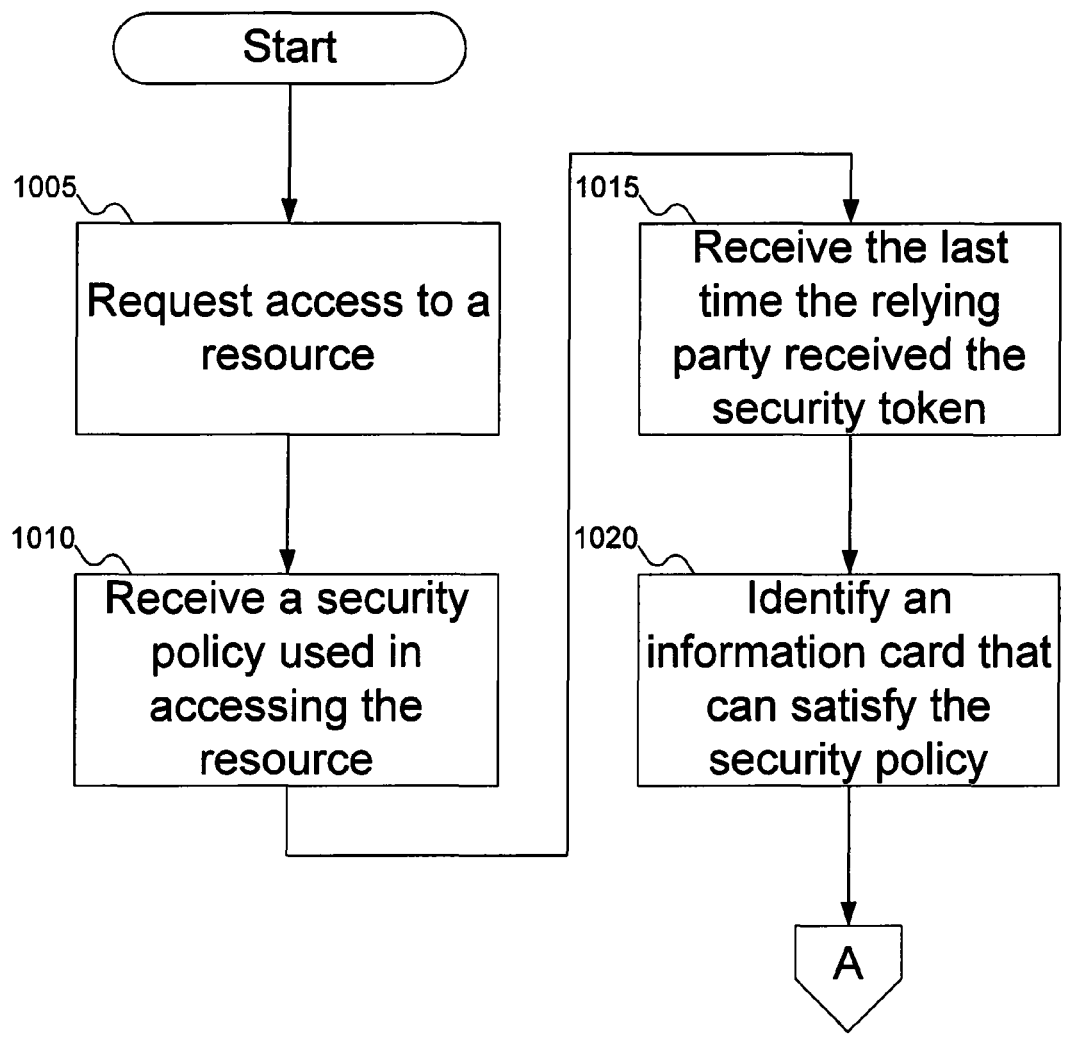
FIGS. 10A-10C show a flowchart of the procedure for the client of FIG. 1 to verify the last time the client sent the security token to the relying party, according to a second embodiment.
Figure 10B:
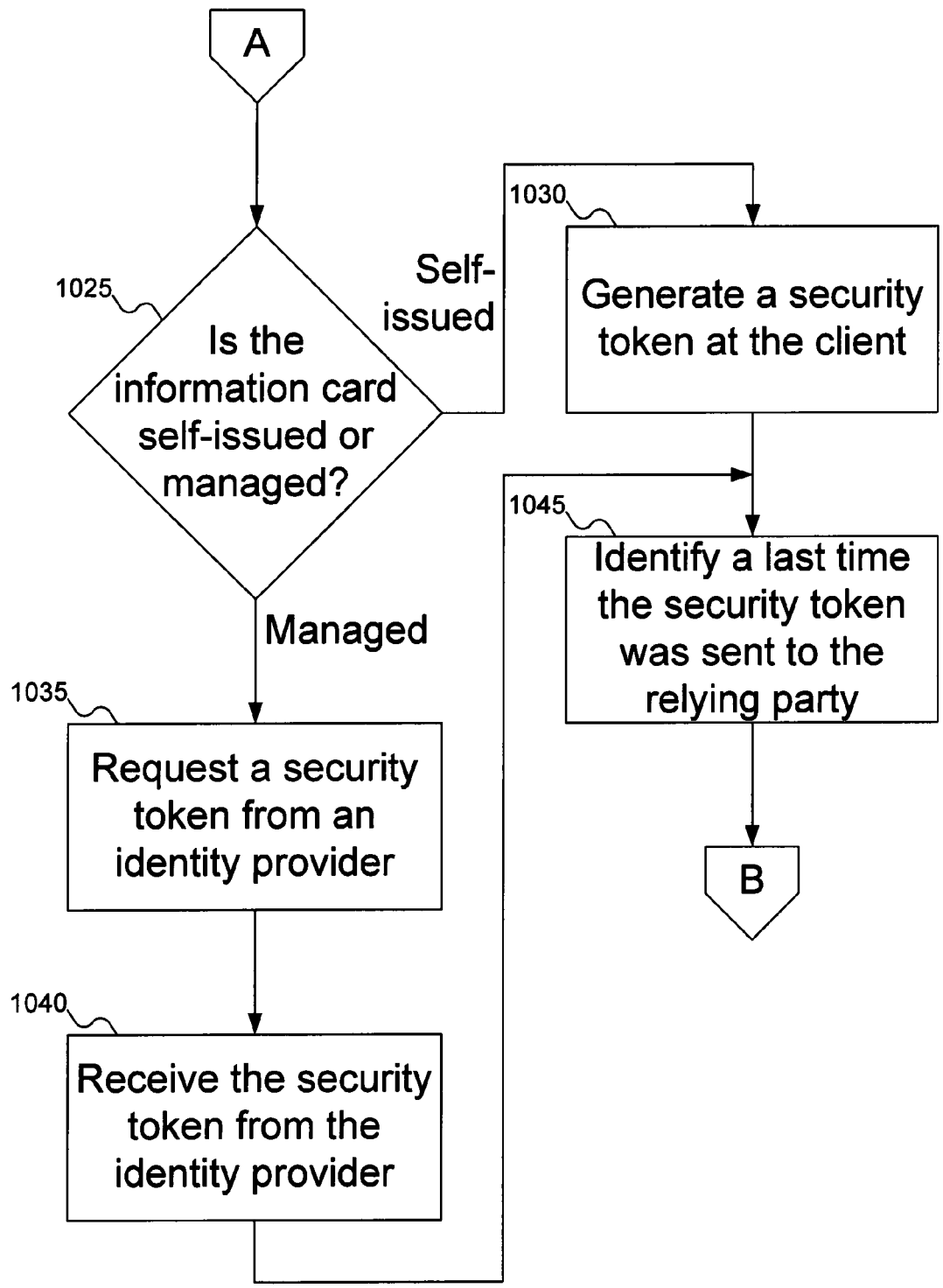
Figure 10C:
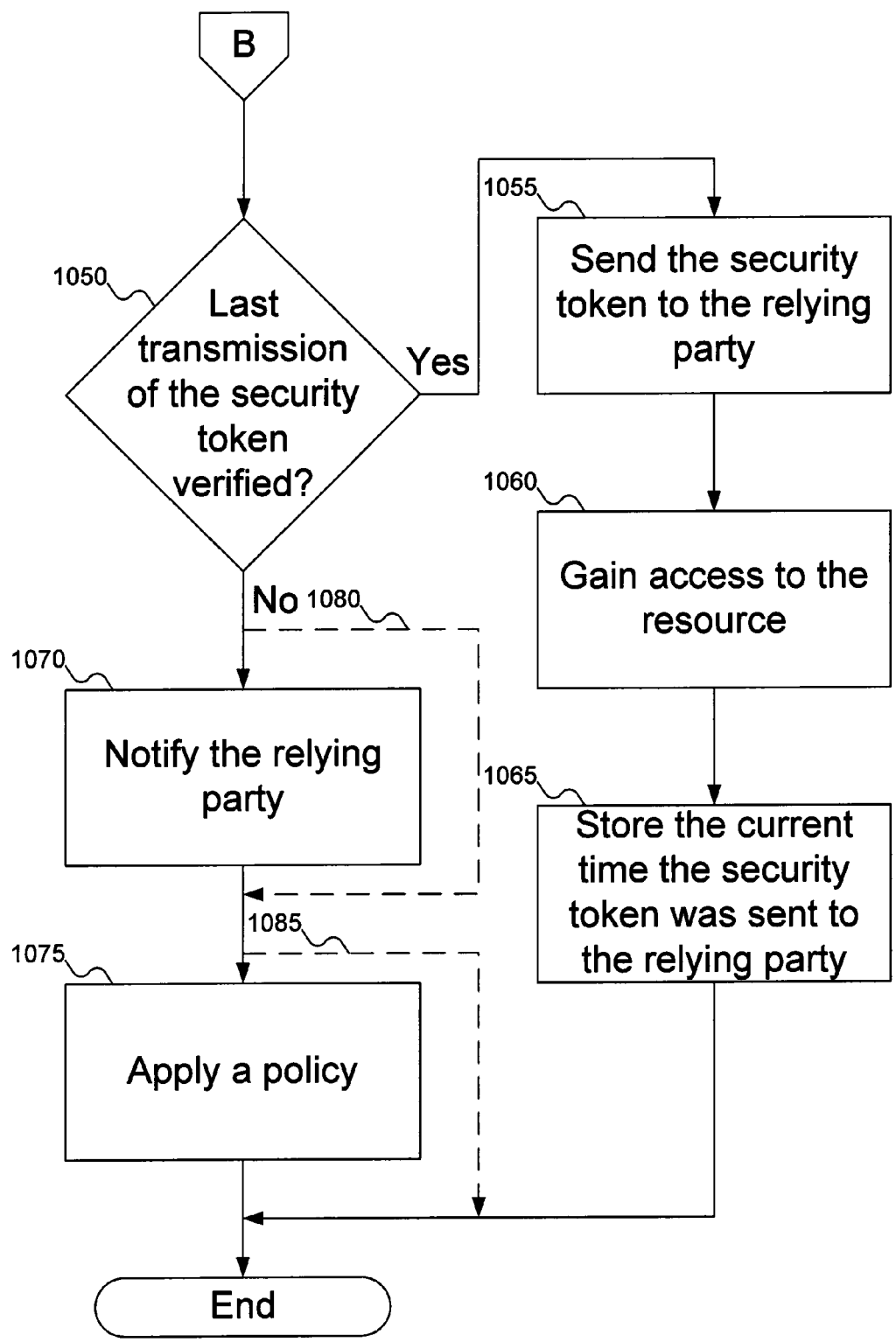
Figure 11A:
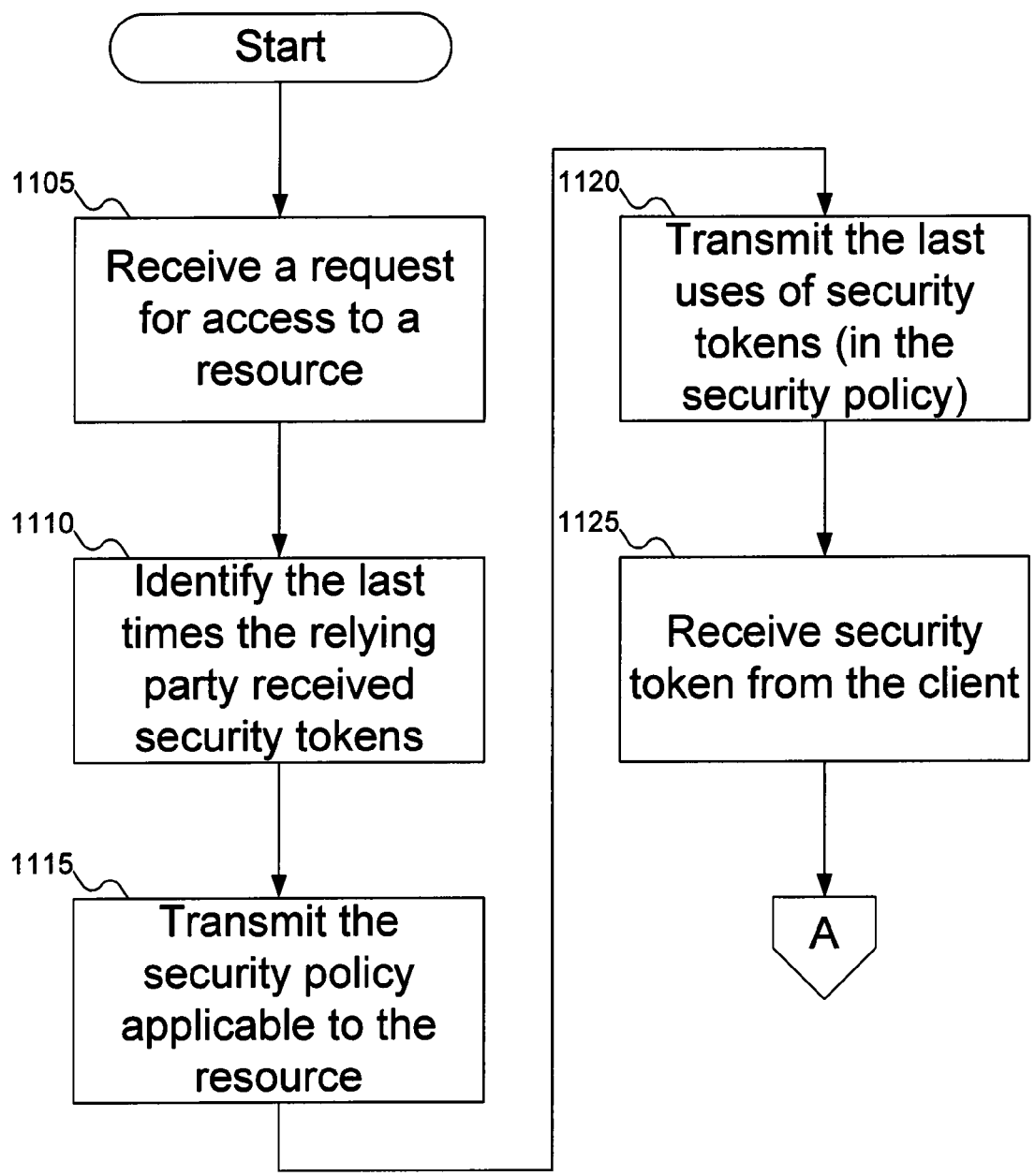
FIGS. 11A-11B show a flowchart of the procedure for the relying party of FIG. 1 to interact with the client to verify the last time the client sent the security token to the relying party, according to the second embodiment.
Figure 11B:
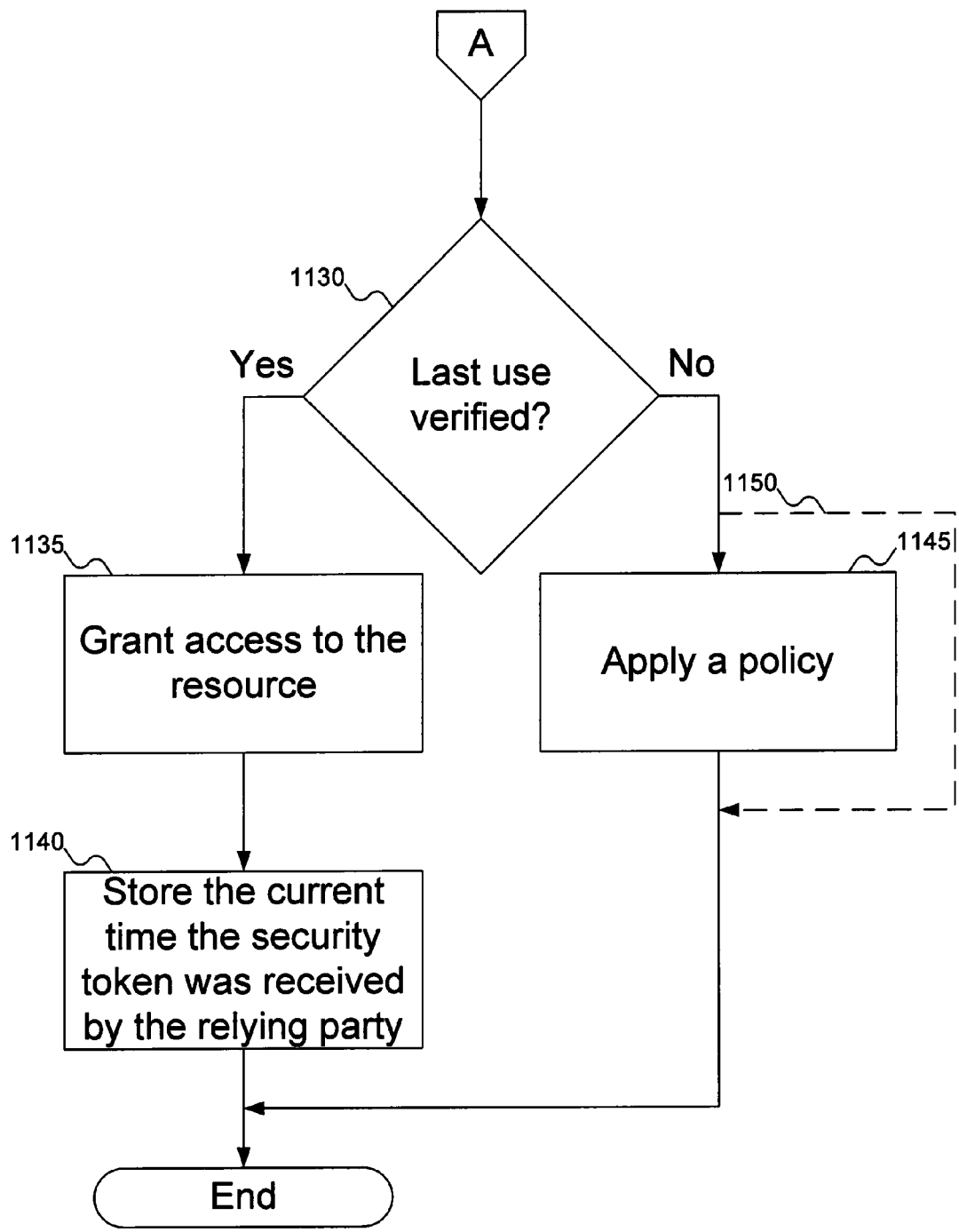

FIGS. 7A-7D and 8A-8B describe how verification can be handled by the relying party. When the client performs the verification, some modification of these flowcharts occurs. FIGS. 10A-10C show a flowchart of the procedure for the client of FIG. 1 to verify the last time the client sent the security token to the relying party, according to a second embodiment, and FIGS. 11A-11B show a flowchart of the procedure for the relying party of FIG. 1 to interact with the client of FIG. 1 to verify the last time the client sent the security token to the relying party, according to the second embodiment.

In FIG. 10A, at block 1005, the client requests access to a resource of the relying party. At block 1010, the client receives a security policy that the relying party wants satisfied before it will grant access to the resource. At block 1015, the client receives from the relying party the last time the relying party received security tokens from the client. As discussed above with reference to FIG. 4, this information can be included in the security policy. At block 1020, the client identifies an information card that can satisfy the security policy.

At block 1025 (FIG. 10B), the system determines whether the identified information card is self-issued or managed (e.g., by an identity provider). If the identified information card is self-issued, then at block 1030, the client generates a security token for the information card. Otherwise at block 1035, the client requests a security token from the manager of the information card; this security token is received by the client at block 1040.

Regardless of whether the identified information card is self-issued or managed, at block 1045, the client identifies the last time the security token was sent to the relying party. The client can access this information from data store 225 (of FIG. 2A).

At block 1050 (FIG. 10C), the client verifies that the last time the relying party received the security token corresponds to the last time the client sent the security token to the relying party. If the last use of the security token was verified, then at block 1055, the client sends the security token to the relying party. At block 1060, the client receives access to the resource, and at block 1065, the client stores the current time that the security token was sent to the relying party (for use the next the relying party wants to verify the client).

On the other hand, if the last use of the security token is not verified, then at block 1070 the client can notify the relying party of the potentially fraudulent use of the security token. At block 1075, the client can apply a policy to address the potential fraud. Blocks 1070 and 1075 can be omitted, as shown by dashed lines 1080 and 1085.

FIGS. 10A-10C show the relying party providing information about the last time the relying party received a security token from the client before the information card has been selected (and therefore before the security token is generated). Thus, the relying party would need to provide information about every security token ever received by the client, even though only one security token ultimately needs to be verified. This enables the client to verify whether any security token used with that relying party has potentially been compromised, at the expense of the relying party having to transmit information that might otherwise be considered unnecessary. A person skilled in the art will recognize that FIGS. 10A-10C can be modified so that the client first selects the information card; after that, the client requests from the relying party the last time the security token generated from that information card was used, reducing the amount of information the relying party transmits to the client.

FIGS. 10A-10C show the client verifying the last use of the security token after the security token is generated. As discussed above, the relying party can transmit to the client information about the last use of and or all security tokens the client has used with the relying party. A person skilled in the art will recognize how FIGS. 10A-10C can be modified so that the client verifies the last uses of any security tokens used with the relying party, and that such verification can occur before the security token is generated.

In FIG. 11A, at block 1105, the relying party receives a request to access a resource. At block 1110, the relying party identifies the last times the relying party received security tokens from the client. At block 1115, the relying party sends the security policy that is to be satisfied to access the resource. At block 1120, the relying party sends to the client information about the last uses of security tokens by the client at the relying party. As discussed above, this information can be included in the security policy. At block 1125, the relying party receives the security token from the client.

At block 1130 (FIG. 11B), the relying party determines whether the last use of the security token was verified by the client. As discussed above with reference to FIGS. 10A-10C, this can be implicit in the fact that the client sent the security token to the relying party, or the relying party can receive from the client an express indication whether the last use of the security token was verified. If the last use was verified, then at block 1135, the relying party grants the client access to the resource, and at block 1140, the relying party stores the current time the relying party received the security token (for use in the next verification). Otherwise, at block 1145 the relying party applies a policy to address the potential fraud. Block 1145 can be omitted, as shown by dashed line 1150.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, instructions, etc. which, when accessed by a machine, result in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data may also be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus (105), comprising:
a receiver (210) to receive a security policy (150) from a relying party (130);

a card selector (205) to select an information card (220) responsive to said security policy (150);

a data store (225) to store a last time (230) the apparatus (105) sent a security token (160) responsive to said selected information card (220) to said relying party (130); and a transmitter (215) to transmit to said relying party (130) said security token (160), wherein said relying party (130) grants access to a resource (315) if a last transmission of the security token (160) to the relying party (130) was verified.

2. An apparatus (105) according to claim 1, wherein:
the receiver (210) is operative to receive said security policy (150) from said relying party (130), said security policy (150) including a request (405) for a last time (230) the apparatus (105) sent said security token (160) to said relying party (130); and the apparatus (105) further comprises an adder (240) to add to said security token (160) said last time (230, 505) said apparatus (105) sent said security token (160) to said relying party (130).

3. An apparatus (105) according to claim 2, wherein the adder (240) is operative to add said last time (230, 505) said apparatus (105) sent said security token (160) to said relying party (130) to said security token (160) before said security token (160) is transmitted from the apparatus (105) to said relying party (130).

4. An apparatus (105) according to claim 1, further comprising a data store updater (235) to store a current time that said security token (160) was transmitted from the apparatus (105) to said relying party (130).

5. An apparatus (130), comprising:
a transmitter (310) to transmit a security policy (150) to a client (105) responsive to a request from said client (105) for access a resource (315);

a receiver (305) to receive said request from said client (105) for said resource (315) and to receive a security token (160) from said client (105) responsive to said security policy (150); and a data store (325) to store a current time that said security token (160) was received by the apparatus (130) from said client (105), wherein the apparatus (130) is operative to grant said client (105) access to said resource (315) if a last transmission of the security token (160) to the apparatus (130) was verified.

6. An apparatus (130) according to claim 5, wherein:
the transmitter (310) is operative to transmit said security policy (150) to said client (105) responsive to said request from said client (105) for access to said resource (315), said security policy (150) including a request (405) for a last time (230) said client (105) sent said security token (160) to the apparatus (130);

the receiver (305) is operative to receive said security token (160) from said client (105) responsive to said security policy (150), said security token (160) including said last time (230, 505) said client (105) sent said security token (160) to the apparatus (130); and the apparatus (130) further comprises an access granter (320) to grant access to said resource (315) if a last time (330) the apparatus (130) received said security token (160) corresponds to said last time (230, 505) said client (105) sent said security token (160) to the apparatus (130).

7. An apparatus (130) according to claim 6, further comprising a signature verifier (355) to verify a digital signature (510) applied to said security token (160) by said client (105).

8. An apparatus (130) according to claim 5, further comprising a policy store (335) to store a policy (340, 345, 350) to apply if said last transmission of said security token (160) to the apparatus (130) was not verified.

9. A method to verify use of an information card (220), comprising:
requesting (705) access to a resource (315) from a relying party (130);

receiving (710) at a client (105) a security policy (150) from the relying party (130);

identifying (720) an information card (220) that satisfies the security policy (130);

transmitting (765) a security token (160) from the client (105) to the relying party (130); and accessing (785) the resource (315) from the relying party (130) if a last transmission of the security token (160) to the relying party (130) was verified.

10. A method according to claim 9, wherein:
receiving (710) at a client (105) a security policy (150) from the relying party (130) includes receiving (715) at the client (105) the security policy (150) from the relying party (130), the security (150) policy including a request (405) for a last time (230) the client (105) sent the security token (160) to the relying party (130); and the method further comprises adding (750) to the security token (160) the last time (230, 505) the client (105) sent the security token (160) to the relying party (130).

11. A method according to claim 10, wherein adding (750) to the security token (160) the last time the client (105) sent the security token (160) to the relying party (130) includes adding (750) to the security token (160) the last time (230, 505) the client (105) sent the security token (160) to the relying party (130) before transmitting the security token (160) from the client (105) to the relying party (130).

12. A method according to claim 9, further comprising storing (790) a current time that the security token (160) was transmitted from the client (105) to the relying party (130).

13. A method to verify use of an information card (220), comprising:
receiving (1105) a request from a client (105) to access a resource (315) at a relying party (130);

transmitting (1115) a security policy (150) to the client (105);

receiving (1125) a security token (160) from the client (105); and granting (1135) access to the resource (315) by the relying party (130) if a last reception of the security token (160) from the client (105) was verified.

14. A method according to claim 13, wherein:
transmitting (1115) a security policy (150) to the client (105) includes transmitting (1115, 815) the security policy (150) to the client (105), the security policy including a request (405) for a last time (230) the client (105) sent the security token (160) to the relying party (130);

receiving (1125) a security token (160) from the client (105) includes receiving (1125) the security token (160) from the client (105), the security token (160) including the last time (230, 505) the client (105) sent the security token (160) to the relying party (130); and granting (1135) access to the resource (315) by the relying party (130) includes verifying (1155, 845) that a last time (330) the relying party (130) received the security token (160) corresponds the last time (230, 505) the client (105) sent the security token (160) to the relying party (130).

15. A method according to claim 13, further comprising applying (865) a policy (340, 345, 350) if the last transmission of the security token (160) to the relying party (130) was not verified.

16. A method according to claim 13, further comprising storing (1140) a current time that the security token (160) was received from the client (105) by the relying party (130).

17. An article, comprising a storage medium, said storage medium having stored thereon instructions that, when executed by a machine, result in:
- requesting (705) access to a resource (315) from a relying party (130);
- receiving (710) at a client (105) a security policy (150) from the relying party (130);
- identifying (720) an information card (220) that satisfies the security policy (130);
- transmitting (765) a security token (160) from the client (105) to the relying party (130); and
- accessing (785) the resource (315) from the relying party (130) if a last transmission of the security token (160) to the relying party (130) was verified.

18. An article according to claim 17, wherein:
- receiving (710) at a client (105) a security policy (150) from the relying party (130) includes receiving (715) at the client (105) the security policy (150) from the relying party (130), the security (150) policy including a request (405) for a last time (230) the client (105) sent the security token (160) to the relying party (130); and
- said storage medium has stored thereon further instructions that, when executed by the machine, result in adding (750) to the security token (160) the last time (230, 505) the client (105) sent the security token (160) to the relying party (130).

19. An article according to claim 18, wherein adding (750) to the security token (160) the last time the client (105) sent the security token (160) to the relying party (130) includes adding (750) to the security token (160) the last time (230, 505) the client (105) sent the security token (160) to the relying party (130) before transmitting the security token (160) from the client (105) to the relying party (130).

20. An article, comprising a storage medium, said storage medium having stored thereon instructions that, when executed by a machine, result in:
- receiving (1105) a request from a client (105) to access a resource (315) at a relying party (130);
- transmitting (1115) a security policy (150) to the client (105);
- receiving (1125) a security token (160) from the client (105); and
- granting (1135) access to the resource (315) by the relying party (130) if a last reception of the security token (160) from the client (105) was verified.

21. An article according to claim 20, wherein:
- transmitting (1115) a security policy (150) to the client (105) includes transmitting (1115, 815) the security policy (150) to the client (105), the security policy including a request (405) for a last time (230) the client (105) sent the security token (160) to the relying party (130);
- receiving (1125) a security token (160) from the client (105) includes receiving (1125) the security token (160) from the client (105), the security token (160) including the last time (230, 505) the client (105) sent the security token (160) to the relying party (130); and
- granting (1135) access to the resource (315) by the relying party (130) includes verifying (1155, 845) that a last time (330) the relying party (130) received the security token (160) corresponds the last time (230, 505) the client (105) sent the security token (160) to the relying party (130).

22. An article according to claim 20, wherein said storage medium has stored thereon further instructions that, when executed by the machine, result in applying (865) a policy (340, 345, 350) if the last transmission of the security token (160) to the relying party (130) was not verified.

23. An article according to claim 20, wherein said storage medium has stored thereon further instructions that, when executed by the machine, result in storing (1140) a current time that the security token (160) was received from the client (105) by the relying party (130).

24. An article according to claim 17, wherein said storage medium has stored thereon further instructions that, when executed by the machine, result in storing (790) a current time that the security token (160) was transmitted from the client (105) to the relying party (130).

25. An apparatus (130) according to claim 5, further comprising a data store updater to store a current time that said security token (160) was received by the apparatus (105) from said client (105).

26. A method according to claim 14, further comprising verifying (825) a digital signature (510) applied to the security token (160) by the client (105).

27. An article according to claim 21, further comprising verifying (825) a digital signature (510) applied to the security token (160) by the client (105).

* * * * *

UNITED STATES PATENT AND TRADEMARK OFFICE
CERTIFICATE OF CORRECTION

PATENT NO. : 8,079,069 B2  
APPLICATION NO. : 12/054137  
DATED : December 13, 2011  
INVENTOR(S) : Burch et al.

Page 1 of 1

It is certified that error appears in the above-identified patent and that said Letters Patent is hereby corrected as shown below:

On Title page 3, item [56] in column 1, under "Other Publications", line 21, delete "arch ive" and insert -- archive --, therefor.

On Title page 3, item [56] in column 1, under "Other Publications", line 23, delete "microsoft age" and insert -- microsoft+age --, therefor.

On Title page 3, item [56] in column 1, under "Other Publications", line 41, delete "Indentity" and insert -- Identity --, therefor.

On Title page 3, item [56] in column 2, under "Other Publications", line 28, after "2006," delete "26".

On Title page 3, item [56] in column 2, under "Other Publications, line 49, delete "Browers" and insert -- Browsers --, therefor.

In column 11, line 29, delete "and or" and insert -- and/or --, therefor.

Signed and Sealed this  
Sixth Day of March, 2012

David J. Kappos  
*Director of the United States Patent and Trademark Office*